United States Patent [19]

Takagi et al.

[11] Patent Number: 5,073,710
[45] Date of Patent: Dec. 17, 1991

[54] OPTICAL DISPLACEMENT DETECTOR INCLUDING A DISPLACEMENT MEMBER'S SURFACE HAVING A DIFFRACTIVE PATTERN AND A HOLOGRAPHIC LENS PATTERN

[75] Inventors: Masaaki Takagi; Shigekazu Nakamura; Atsushi Omura, all of Tokyo, Japan

[73] Assignee: Copal Company Limited, Tokyo, Japan

[21] Appl. No.: 584,786

[22] Filed: Sep. 19, 1990

[30] Foreign Application Priority Data

Sep. 21, 1989 [JP] Japan ............................... 1-246183
Sep. 28, 1989 [JP] Japan ............................... 1-253287
Oct. 16, 1989 [JP] Japan ............................... 1-268594
Oct. 16, 1989 [JP] Japan ............................... 1-268595
Oct. 23, 1989 [JP] Japan ............................... 1-275479
Dec. 7, 1989 [JP] Japan ............................ 1-141206[U]

[51] Int. Cl.⁵ ............................................. G01D 5/34
[52] U.S. Cl. ......................... 250/231.14; 250/231.16; 250/237 G; 356/374
[58] Field of Search ......... 250/237 G, 231.14, 231.16; 356/374, 375

[56] References Cited

U.S. PATENT DOCUMENTS

| | | | |
|---|---|---|---|
| 3,153,111 | 10/1964 | Barber et al. | 356/374 |
| 3,879,136 | 7/1973 | Takeda | 356/209 |
| 4,079,252 | 3/1978 | Brake | 356/374 |
| 4,218,615 | 10/1978 | Zinn, Jr. | 250/231 |
| 4,528,448 | 7/1985 | Doggett | 250/237 G |
| 4,559,524 | 12/1985 | Suzuki | 250/231.16 |
| 4,629,886 | 12/1986 | Akiyama et al. | 250/237 G |
| 4,668,862 | 5/1987 | Waibel | 250/231 |
| 4,680,466 | 7/1987 | Kuwahara et al. | 250/231.14 |
| 4,700,062 | 10/1987 | Ernst | 250/231.14 |
| 4,823,001 | 4/1989 | Kobayashi et al. | 250/231 |

FOREIGN PATENT DOCUMENTS 5023617 8/1975 Japan .
1280215 11/1989 Japan .

*Primary Examiner*—David C. Nelms
*Assistant Examiner*—Que T. Le
*Attorney, Agent, or Firm*—Sixbey, Friedman, Leedom & Ferguson

[57] ABSTRACT

An apparatus for optically detecting displacement. The light source is provided for emitting a coherent primary light. A displacement member is disposed to undergo a displacement transversely of the primary light to receive the primary light on its face. The displacement member has on its face a diffractive pattern effective to diffract the primary light and a holographic lens pattern effective to converge the primary light to thereby convert the primary light into a secondary light. A detector is receptive of the secondary light to detect optically the displacement of the displacement member.

19 Claims, 20 Drawing Sheets

0.1mm

OPTICAL DISPLACEMENT DETECTOR INCLUDING A DISPLACEMENT MEMBER'S SURFACE HAVING A DIFFRACTIVE PATTERN AND A HOLOGRAPHIC LENS PATTERN

The present invention relates to optical displacement detectors, and more specifically relates to laser encoders utilizing a point light source diffraction.

Recently, rotary encoders have been used as a rotation angle sensor for fast and accurate positioning in industrial robots and numerically controlled machine tools, and further for smooth velocity control from low speed range to high speed range. However, the conventional magnetic rotary encoder and optical encoder are susceptive to vibration and shock in higher resolution range. Moreover, they have rather large size and high production cost, hence they cannot satisfy various needs in developing automation technology.

In view of this, there has been proposed, for example, in Japanese Patent Application Laid-open Publication No. 47616/1988 another type of the optical rotary encoder utilizing diffraction of divergent spherical wave from a coherent point light source. According to diffraction using a point light source, a diffraction image shifts like a projection image in response to displacement of a diffractive pattern formed on an object. In such case, the diffraction image or interference image can be enlarged by ratio of a distance between a light source and a diffractive pattern, and another distance between the diffractive pattern and a photodetector. Therefore, fine or microdisplacement of the diffractive pattern or grating can be quite easily detected without any additional enlarging optical system. For example, this type of optical rotary encoder can be constructed by a semiconductor laser and a radial diffractive pattern having several μm pitch to achieve high performance and high resolution power. This type of rotary encoder features its simple structure and sufficient spacing between a photodetector and an encoder plate formed with the diffractive pattern to ensure resistance against shock or vibration.

Generally, the rotary encoder of the type utilizing the point light source diffraction can obtain high resolution encoding output indicative of relative displacement, because the interference image formed by the diffractive pattern has clear fringes and very close pitch interval. On the other hand, the encoder plate has also formed with a slit indicative of a given absolute reference position. However, incident primary light passing through and diffracted by the slit is not converged such that secondary light does not have sharp peak intensity so that the reference position is not detected accurately. Namely, the secondary light passing through the reference slit has a rather broad peak width which would contain several number of fringes of the interference image formed by the diffractive pattern. Therefore, high resolution power cannot be obtained in detection of the absolute reference position of the encoder plate, while the diffractive pattern enables the accurate detection of relative displacement of the encoder plate.

Further, in the encoder of the type utilizing the point light source diffraction, a divergent primary light is irradiated onto the diffractive pattern so that a diffracted secondary light is also divergent. Therefore, a photodetector having a limited sensitive face can receive only a minor part of the divergent secondary light. The received light amount is far smaller than the total light amount generated from the point light source, hence efficiency is less than 1%. When the photodetector only receives a trace of the secondary light, a detection circuit connected to the photodetector must carry out heavy amplification to thereby hinder S/N ratio and to degrade frequency characteristics.

SUMMARY OF THE INVENTION

In view of the above noted drawbacks of the prior art, a first object of the invention is to, generally, increase collecting efficiency of secondary light from the encoder plate to the photodetector so as to improve the detection accuracy.

A second object of the invention is to, particularly, provide a converging holographic lens pattern directly on the encoder plate to increase collecting efficiency of the secondary light.

A third object of the invention is to, specifically, form locally a holographic lens pattern at a given reference position or point of the encoder plate to improve detection accuracy of the reference point.

A fourth object of the invention is to, specifically, form a planar holographic lens pattern in superposed relation to the diffractive pattern so as to focus the diffraction image onto a face of the photodetector. Other objects will be apparent in conjunction with the following description and the drawings.

According to a first aspect of the present invention, a local holographic lens pattern is formed on the encoder plate or displacement member adjacently to the diffractive pattern. A center of the holographic lens pattern is positioned at a given reference point of the displacement member. Each time the holographic lens pattern traverses an incident light, the incident light is converged to form a reference spot image at a given distance along an optical axis which passes through a light source and the center of the holographic lens pattern. The holographic lens pattern operates based on interference of coherent light likewise the adjacent diffractive pattern to thereby effect excellent optical convergence so that a peak width of the reference spot image is the same dimension as or less than the fringe pitch of an interference image formed by the diffractive pattern. A stationary slot is disposed on a plane of the reference spot image, and a photodetector is disposed behind the slot to selectively receive the spot image through the slot to thereby detect quite accurately the reference point of the displacement member.

According to a second aspect of the present invention, the encoder plate is formed thereon with a one-dimensional diffractive pattern in the form of slits arranged a given pitch so as to convert an incident diverging light into a diverging diffracted light effective to form an enlarged interference image at a given position in the form of fringe having an enlarged pitch. This interference image shifts in response to displacement of the encoder plate or displacement member to thereby enable detection of the displacement of encoder plate. On the other hand, a planar holographic lens pattern is formed on the same face of the encoder plate, in superposed relation to the diffractive pattern, in the form of slits arranged given intervals along a direction normal to the slits of the diffractive pattern. The holographic lens pattern receives the divergent incident light to effect diffraction and convergence thereof. Consequently, the divergent diffracted light formed by the one-dimensional diffractive pattern is concurrently converged by the holographic lens pattern in the direction normal to the displacement direction. Therefore, the resulting interference image is contracted only in the normal or orthogonal direction according to the orthogonal arrangement of the holographic lens pattern. On the other hand, the enlarged pitch of the interference image is reserved as it is in the displacement direction. Therefore, while not degradating the displacement information in the displacement direction of the encoder plate, the interference image can be contracted or concentrated only in the orthogonal direction to thereby improve the utilization efficiency of the incident divergent light.

BRIEF DESCRIPTION OF THE DRAWINGS

FIGS. 1 through 8 relate to the first aspect of the invention, wherein FIG. 1 is a schematic perspective view of a laser rotary encoder; FIG. 2 is a block diagram of a detection circuit utilized in the FIG. 1 laser rotary encoder; FIG. 3 is an enlarged partial plan view showing a diffractive pattern and a holographic lens pattern formed on a rotary disc; FIG. 4 is an illustrative diagram showing arrangement of components of the laser rotary encoder; FIG. 5 is an illustrative diagram showing calculation of radius of each ring slit of the holographic lens pattern; FIG. 6 is an illustrative diagram showing light intensity distribution of a reference spot image formed by the FIG. 3 holographic lens pattern; FIG. 7 is a schematic perspective view of a laser linear encoder; and FIG. 8 is an illustrative diagram showing principle of the laser encoder utilizing a point light source diffraction.

FIGS. 9 through 11 relate to the second aspect of the present invention, wherein FIG. 9 is a perspective view showing one embodiment of the inventive laser rotary encoder; FIG. 10 is an enlarged partial plan view showing arrangement of one-dimensional diffractive pattern and planar holographic lens pattern used in the laser rotary encoder; and FIG. 11 is a diagram showing operation of the holographic lens pattern.

FIGS. 12 through 14 relate to a complete unit of the laser encoder assembled into a cylinder, wherein FIG. 12 is a sectional view of the laser encoder complete unit; FIG. 13 is a partial sectional view showing a mount structure of a laser diode; and FIG. 14 is an illustrative diagram showing the operation of the laser encoder complete unit.

FIGS. 15 through 18 relate to one modification of the laser rotary encoder, wherein FIG. 15 is a schematic diagram showing construction of the laser rotary encoder; FIG. 16 is a schematic diagram illustrating arrangement of a mask plate and a photodetector used in the laser rotary encoder; FIG. 17 is a detailed circuit diagram showing a detection circuit of the laser rotary encoder; and FIG. 18 is a waveform diagram showing operation of the detection circuit.

FIGS. 19 through 23 relate to another modification of the laser rotary encoder, wherein FIG. 19 is a schematic perspective view showing construction of the laser rotary encoder; FIG. 20 is an illustrative view showing arrangement of a stationary mask plate and a photodetector of the laser rotary encoder; FIG. 21 is a detailed block diagram of a detection circuit in the laser rotary encoder; FIG. 22 is a waveform diagram showing operation of the detection circuit; and FIG. 23 is a block diagram showing another example of the detection circuit.

FIGS. 24 through 28 relate to a further modification of the inventive laser rotary encoder, wherein FIG. 24 is a schematic perspective view showing construction of the laser rotary encoder; FIG. 25 is an illustrative diagram showing arrangement of a stationary mask plate and a photodetector in the laser rotary encoder; FIG. 26 is a detailed circuit diagram showing a detection circuit of the laser rotary encoder; FIG. 27 is a waveform diagram illustrating operation of the detection circuit; and FIG. 28 is an illustrative diagram indicating occurrence timings of detection pulses.

DETAILED DESCRIPTION OF EMBODIMENTS

Figure 1:
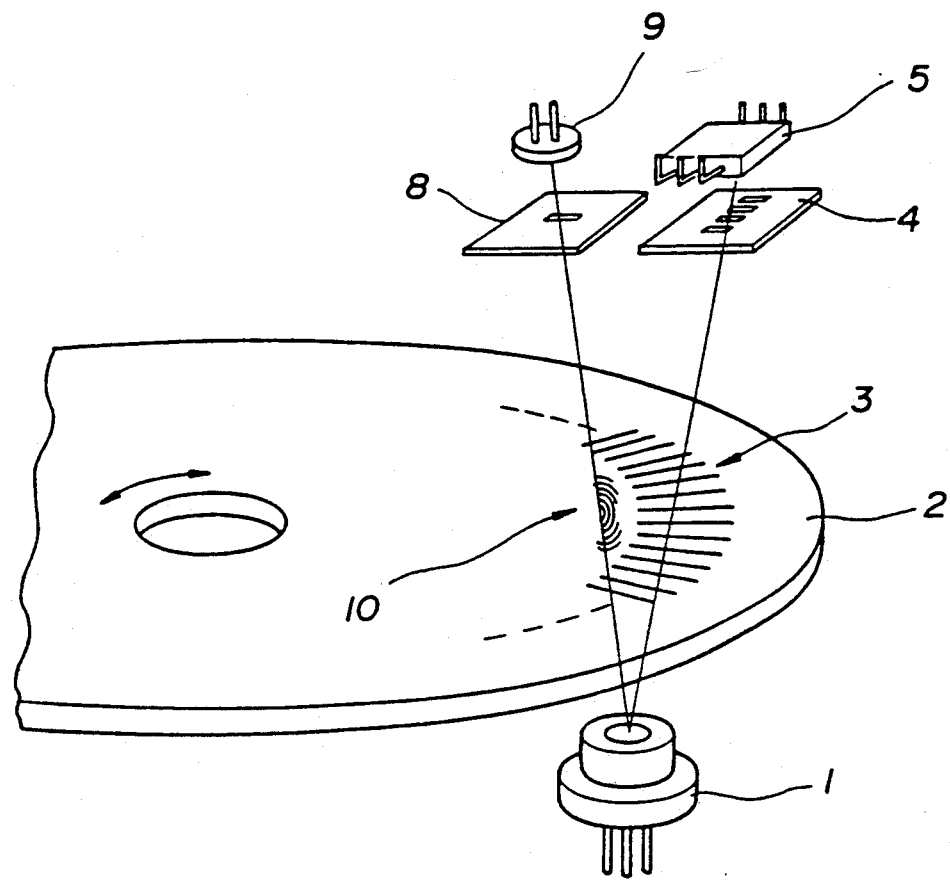

FIG. 1 is a schematic perspective view showing an embodiment of the laser rotary encoder according to the first aspect of the invention. The laser rotary encoder has a point light source 1 composed, for example, of a semiconductor laser. The point light source 1 emits a coherent primary light having a wavelength of $\lambda 780$ within given solid radiation angle. A displacement member 2 in the form of a rotational disc is disposed a given distance L from the light source 1. The disc 2 is formed on its annular periphery with a diffractive grating or pattern 3 in the form of a plurality of radially arranged slits along the annular periphery. The diffractive pattern 3 has a given pitch T of the radial slits, and traverses an optical path from the light source 1 with the rotation of the disc 2 so as to form an enlarged diffraction or interference image forwardly a given distance M from the disc 2. This interference image shifts in response to the angular displacement of the diffractive pattern 3 on the disc 2. A stationary mask plate 4 is disposed the distance M. The mask plate 4 constitutes a spatial filter having a spatial frequency corresponding to a pitch P of fringes of the interference image. A photo detector 5 is disposed behind the mask plate 4 so as to receive the diffracted light or secondary light through slots of the mask plate 4 to thereby produce an AC signal according to periodical intensity change of the received secondary light. A rotational velocity of the encoder rotary disc 2 can be detected according to a frequency of the AC signal, and angular displacement of the rotary disc 2 can be detected according to peak numbers of the produced AC signal.

A local holographic lens grating or pattern 10 is formed at a given reference position on the disc 2 adjacently to the annular diffractive pattern 3 and radially inward thereof. The local holographic lens pattern 10 can pass across an effective cross section of a beam of the primary light emitted from the point light source 1. Each time the local holographic lens pattern 10 traverses the light path, the incident part of the primary light is converged into a secondary light effective to form a reference spot image having a quite sharp peak width at the distance M. Another stationary mask plate 8 is disposed at a position of the reference spot image. The mask plate 8 is formed with a slot having an opening width corresponding to a dimension of the spot image. Another photodetector 9 is disposed immediately behind the mask plate 8 so as to receive a part of the secondary light passing through the mask plate 8 to thereby output a corresponding pulse signal. As described, the holographic lens pattern 10 is designed to form the spot image at the given interval M from the encoder plate 2.

Figure 2:
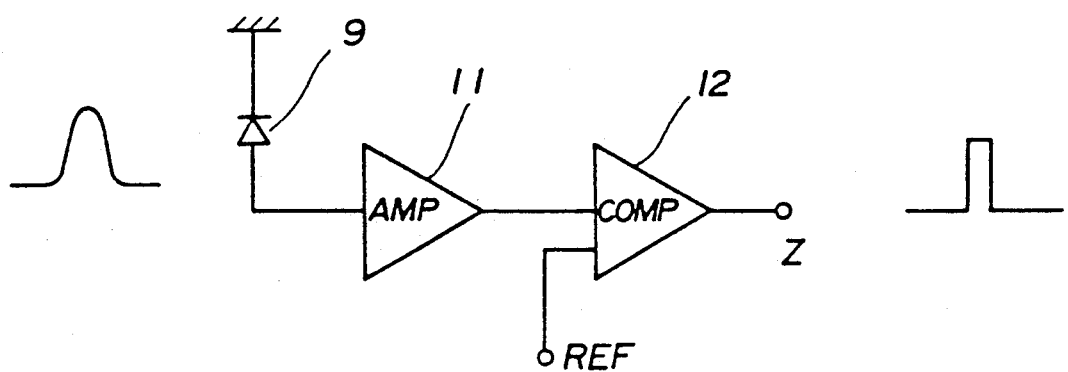
Figure 8:
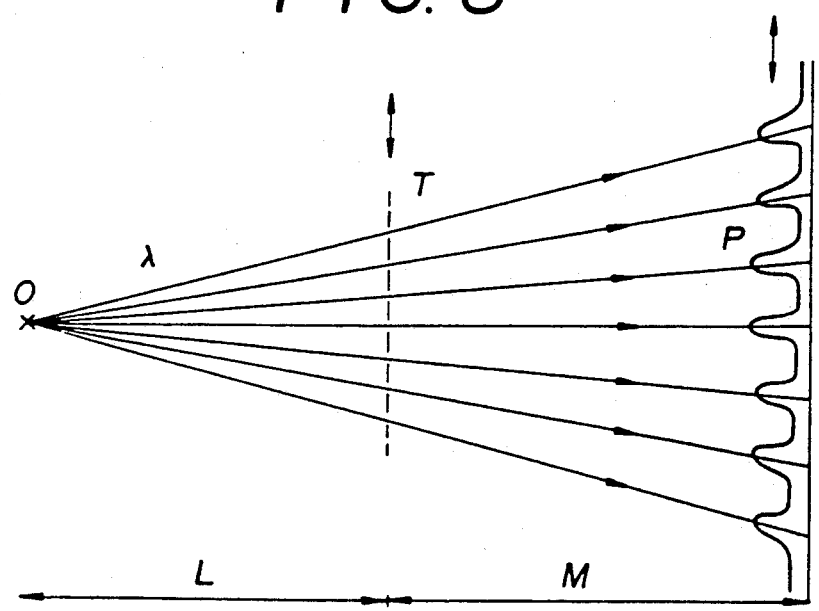

Before proceeding to the description with reference to FIG. 2, some description is given for principle of the laser encoder utilizing the point light source diffraction with reference to FIG. 8 in order to facilitate better understanding of the invention. A point light source O emits a coherent primary light having a wavelength $\lambda$ along an optical axis. One-dimensional diffractive pattern is disposed at the interval L from the light source O displaceably in opposite directions as indicated by the double-headed arrow. This diffractive grating or pattern is composed of a plurality of slits arranged at a pitch T. The coherent primary light irradiates this moving diffractive pattern so that an interference or diffraction image is projected at the distance M from the diffractive pattern. The interference image is composed of fringes of dark and light alternate bands arranged by a given spatial period P. This interference image is an enlarged projection of the diffractive pattern and therefore shifts in response to the displacement of the diffractive pattern.

In order to obtain a clear and sharp interference image, the following relation (1) must be satisfied according to Fresnel diffraction theory:

$$\frac{M+L}{ML\lambda} T^2 = \frac{G}{H} \quad (G, H: \text{integer}) \tag{1}$$

Namely, the various parameters L, M, $\lambda$ and T of the rotary encoder are set to satisfy the relation (1) to form a clear interference image. In this case, the interference image has a spatial period or pitch P determined according to the following relation (2):

$$P = \frac{M+L}{L} \cdot \frac{1}{G} T \tag{2}$$

As indicated by the relation (2), the pitch P of the interference image is M+L/L times as great as the pitch T of the diffractive pattern.

Returning to FIG. 2, the description is given for operation of detecting a reference position on the displacement member or disc 2 in the FIG. 1 laser encoder. FIG. 2 shows a detection circuit for processing a detection signal outputted from the photodetector 9 to produce a reference pulse signal Z indicative of the disc reference point. This detection circuit is comprised of an amplifier 11 connected to the photodetector 9 in the form of a photodiode and a comparator 12 connected in series to the amplifier 11. As shown in the figure, the photodetector 9 outputs a detection signal having a peak waveform, and its peak width is quite narrow correspondingly to a diameter of the spot image formed by the holographic lens pattern 10 as compared to the prior art. This detection signal is amplified by the amplifier 11, and then is inputted into the comparator 12 where the signal is shaped into a rectangular reference position pulse Z which occurs during a very small angular displacement.

Figure 3:
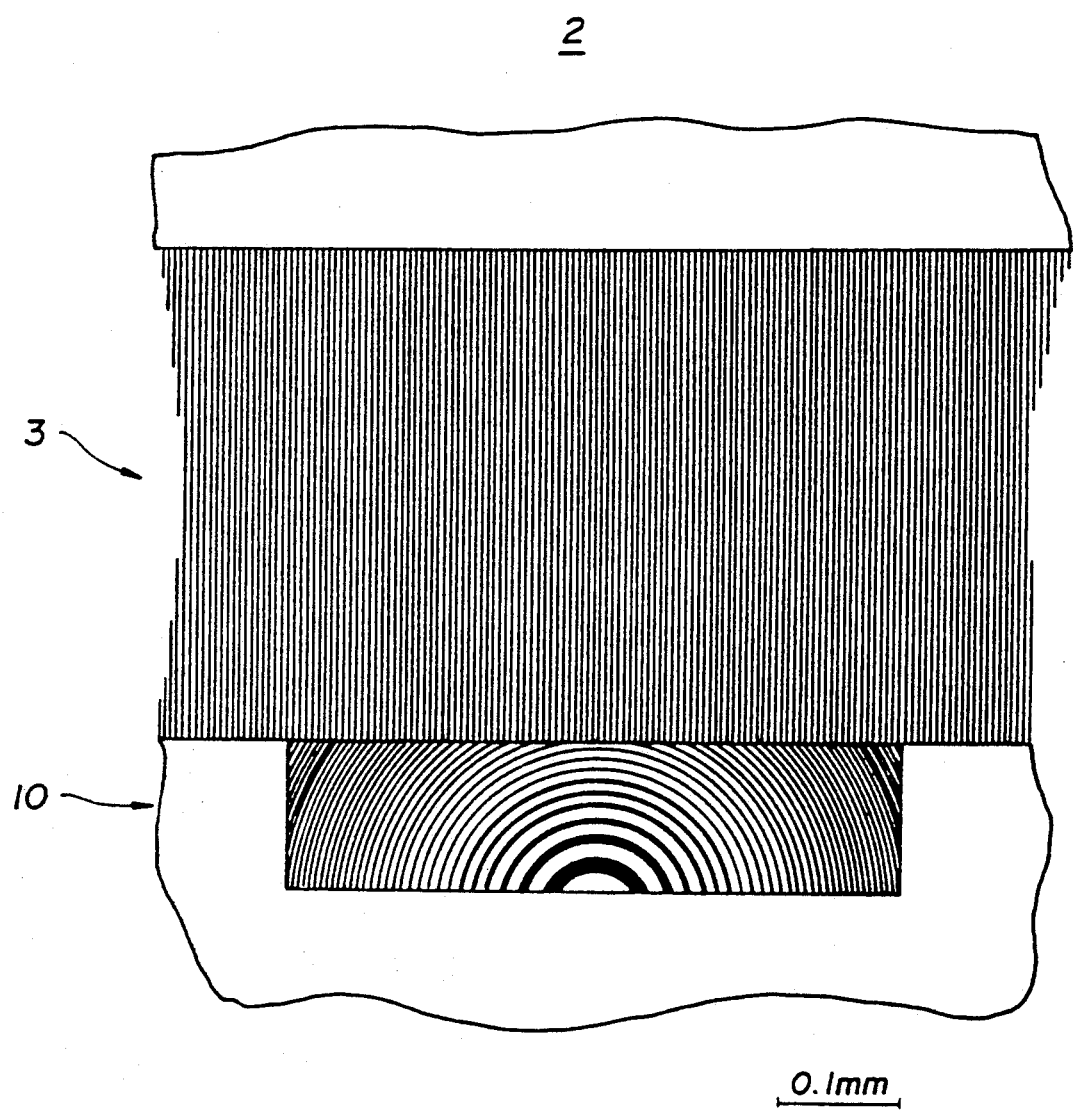

Next description is given for dimension and shape of the local holographic lens pattern 10. FIG. 3 is an enlarged partial plan view of the encoder disc 2 shown in FIG. 1. The diffractive pattern 3 is comprised of a plurality of stripe slits, and the adjacent holographic lens pattern 10 is comprised of a plurality of coaxial circular slits. These stripe slit and circular slits are formed concurrently on the same face of a glass substrate disc by fine photolithography and etching technology. The coherent light emitted from the point light source 1 through a given solid angle concurrently irradiates the diffractive pattern 3 and holographic lens pattern 10. In this arrangement, a major part of the effective cross section of the incident light is assigned to an area of the diffractive pattern 3, and a minor part thereof is assigned to an area of the holographic lens pattern 10.

Therefore, in this embodiment, the holographic lens does not have a complete circular shape, but has a rectangularly cut shape having 0.5 mm of length and 0.125 mm of width. Generally, an ideal holographic lens pattern has a great aperture diameter and a perfect circular shape. However, when enlarging the aperture size, pitch of the ring slits becomes so close in the periphery, thereby causing fabrication difficulty. In addition, it would be not efficient to increase the size of aperture beyond the effective cross section of the incident light beam.

Figure 4:
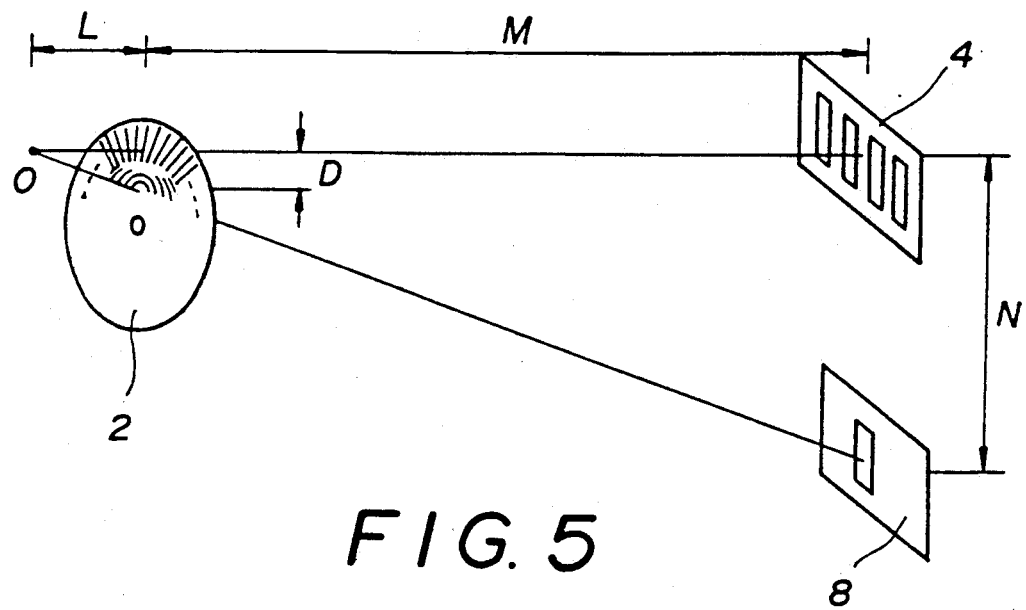

FIG. 4 is a schematic diagram showing geometric arrangement of components of the FIG. 1 rotary encoder. In this embodiment the interval L is set to L = 1.45 mm between the origin 0 of the point light source 1 and the displacement member 2. This interval L includes 0.25 mm of a thickness of the disc 2 composed of glass having 1.51 of refractive index. In such case, the value of L must be calculated in terms of optical length in the before-mentioned relations (1) and (2). The interval M is set to M = 19.46 mm between the disc 2 and the stationary mask 4. The pitch T of the diffractive pattern 3 is set to T = 5.5 $\mu$m. According to the relation (2), the pitch P of the interference image fringes is calculated to P = 83.627 $\mu$m by using the value of various parameters as set above. Therefore, when the disc 2 angularly displaces one pitch of 5.5 $\mu$m, the interference image shifts about 80 $\mu$m of distance along the stationary mask plate 4.

As shown in the figure, the other stationary mask plate 8 is disposed on the same plane for filtering the reference spot image adjacently with the stationary mask 4 which filters the interference image. In such case, in order to detect the reference point of the rotary disc 2 with an accuracy higher than the resolution of the interference image, i.e., the fringe pitch P, the holographic lens pattern may form a reference spot image having, for example, about 40 $\mu$m of spot diameter on the stationary mask plate 8. Therefore, the stationary mask plate 8 is formed with a slot having about 40 $\mu$m of opening width.

In the geometric arrangement shown in FIG. 4, the following relation (3) is held between the aperture radius R of the holographic lens pattern 10 and the spot diameter S of the reference spot image as follows:

$$R = 0.41 \frac{\lambda M}{S/2} \tag{3}$$

The radius R is calculated to R = 0.311 mm with using the relation (3) by setting the parameters M = 19.46 mm, S = 40 $\mu$m and $\lambda$ = 780 nm. The holographic lens pattern has, therefore, ideally 0.622 mm of the aperture diameter. However, as described before, if the aperture diameter is set to 0.622 mm, the pitch of ring slits is too close on the periphery of the holographic lens pattern. Therefore, actually the holographic lens pattern is cut into a rectangular shape having 0.5 mm of length and 0.125 mm of width as shown in FIG. 3.

Next, in the geometrical arrangement where the stationary mask plates 4 and 8 are disposed on the same plane and a spacing N therebetween is set to N = 5 mm, a distance D is set to D = 0.347 mm between one optical axis which passes through the diffractive pattern 3 and another optical axis which passes through the center of the holographic lens pattern 10 according to proportional relation to the spacing N as shown in FIG. 4.

Figure 5:

The holographic lens pattern 10 is comprised of a plurality of ring slits coaxially arranged around the optical axis which possess the center of the pattern 10. Radius $R_I$ of each ring slit is set such that light components passing the respective ring slits interfere positively with each other to form a spot image on the mask plate 8. Referring to FIG. 5, such condition is represented by the following relation (4):

$$A + B = (K_0 + K)\lambda \quad (4)$$

where $I = 0, 1, 2, \ldots$

In order to satisfy the relation (4), radius $R_I$ of each ring slit must be set according to the following relation (5):

$$R_I^2 = \frac{\{L^2 + M^2 - (K_0 + I)^2\lambda^2\} - 4L^2M^2}{4(K_0 + I)^2\lambda^2} \quad (5)$$

where $$K_0^2 = \frac{(L^2 + M^2 + 2R_0^2) + 2\sqrt{(R_0^2 + L^2)(R_0^2 - M^2)}}{\lambda^2}$$

where $R_I = R_O$ when $I = O$.

The relation (5) can be approximated by the following relation (6):

$$R_I^2 = R_0^2 + \frac{2LM\lambda}{L + M} I \quad (6)$$

Consequently, the radius $R_I$ of each ring slit can be calculated according to the relation (6) by setting the given values to the various parameters appearing in the relation (6).

Figure 6:
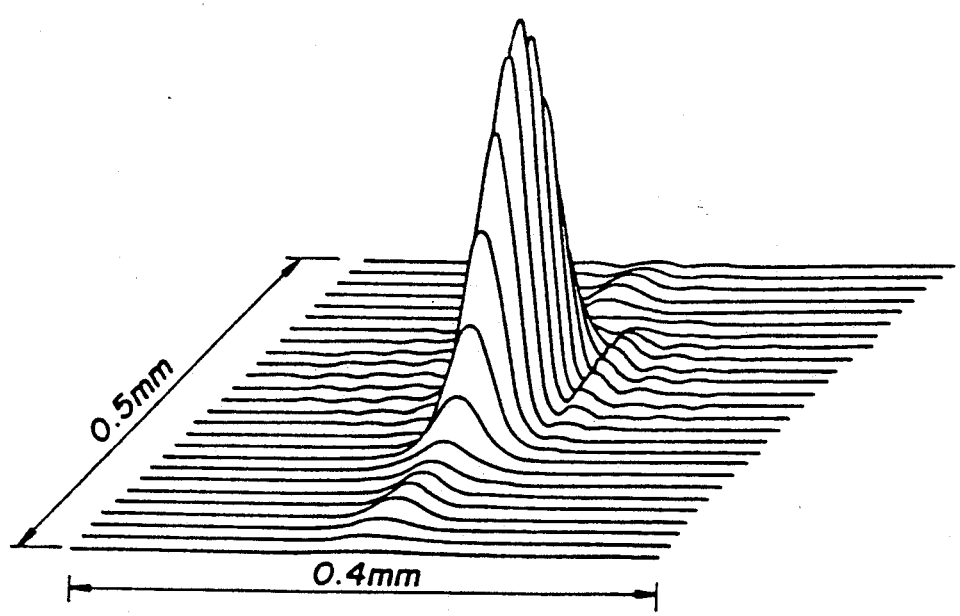

FIG. 6 shows a light intensity distribution of the spot image formed by the holographic lens pattern 10 having the dimension and shape determined as described above. The intensity distribution of the spot image has a quite sharp peak effective to enable detection of the reference point of the displacement disc with the same accuracy as or higher accuracy than the resolution power of the diffractive pattern.

Figure 7:
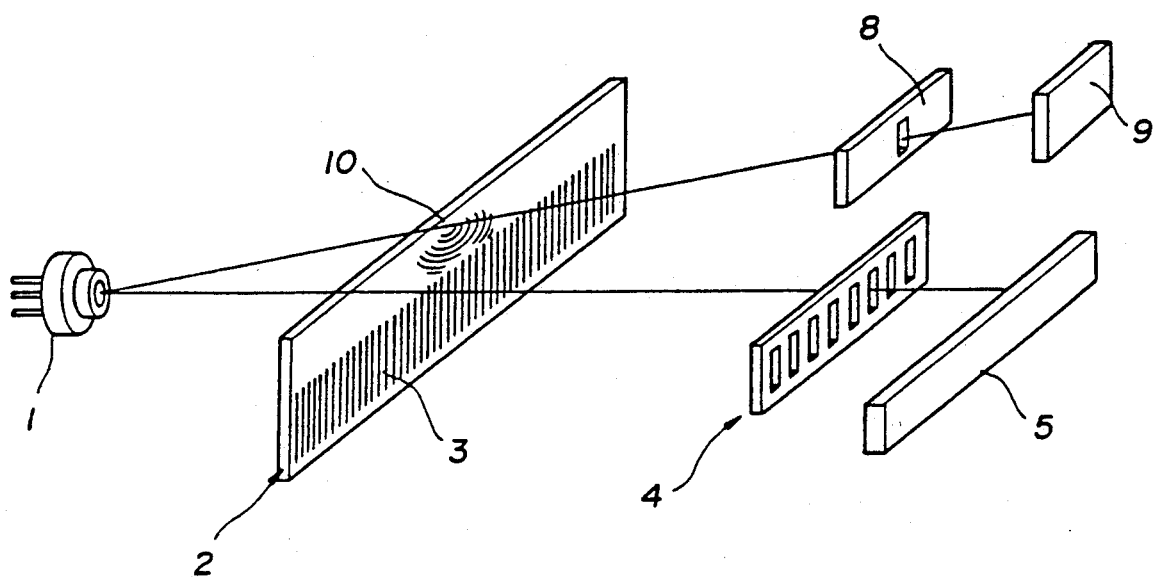

Lastly, FIG. 7 is a schematic perspective view showing a laser linear encoder according to the first aspect of the invention. The linear encoder is comprised of a point light source 1 for emitting a coherent light, an elongated displacement member 2 displaceable linearly in the opposite directions, a one-dimensional diffractive grating 3 formed on the displacement member 2, a stationary mask plate 4 for filtering an interference image formed by the diffractive grating or pattern 3, and a photodetector 5 disposed to receive the interference image through the mask plate 4 to produce a corresponding AC detection signal. In addition, a holographic lens pattern 10 is formed adjacently above the one-dimensional diffractive pattern 3 so as to form a spot image. Another stationary mask plate 8 is disposed to filter the spot image. Another photodetector 9 is disposed behind the mask plate 8 to receive the spot image through the mask plate 8 to thereby output a detection pulse signal indicative of passage of the reference point of the linear displacement member 2.

In the embodiments shown in FIGS. 1-7, a point light source is utilized to produce a coherent light of spherical wavefront. However, the present invention is not limited to these embodiments, but another coherent light of planar wavefront can be effectively used. In such case, the diffractive pattern does not effect enlarging function for the planar wavefront light so that the aperture size of the holographic lens pattern must be increased to intensively concentrate the incident light.

Figure 9:
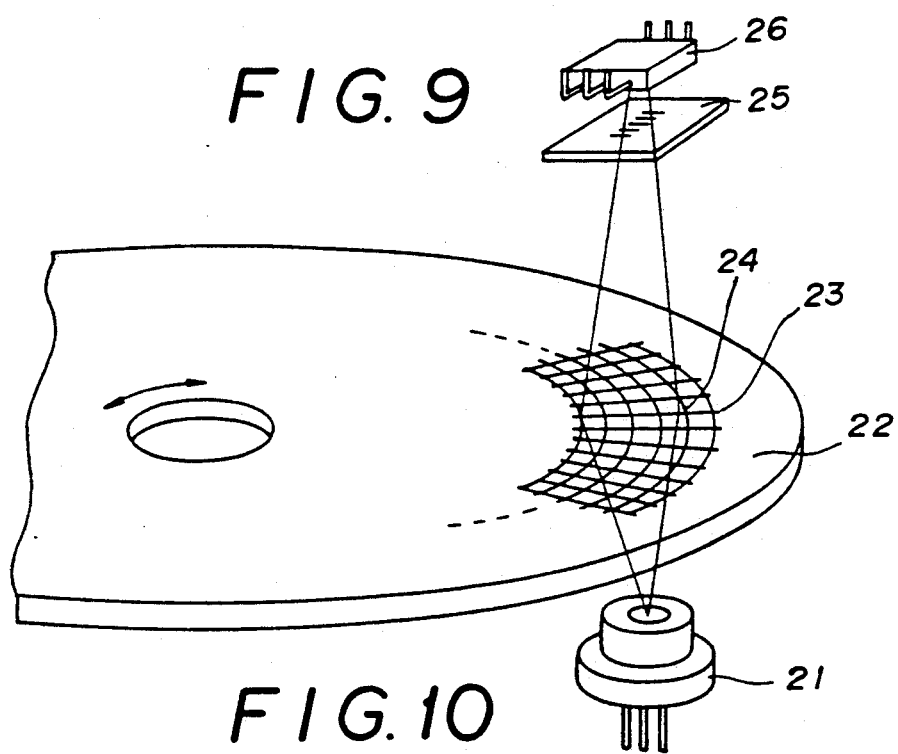
Figure 10:
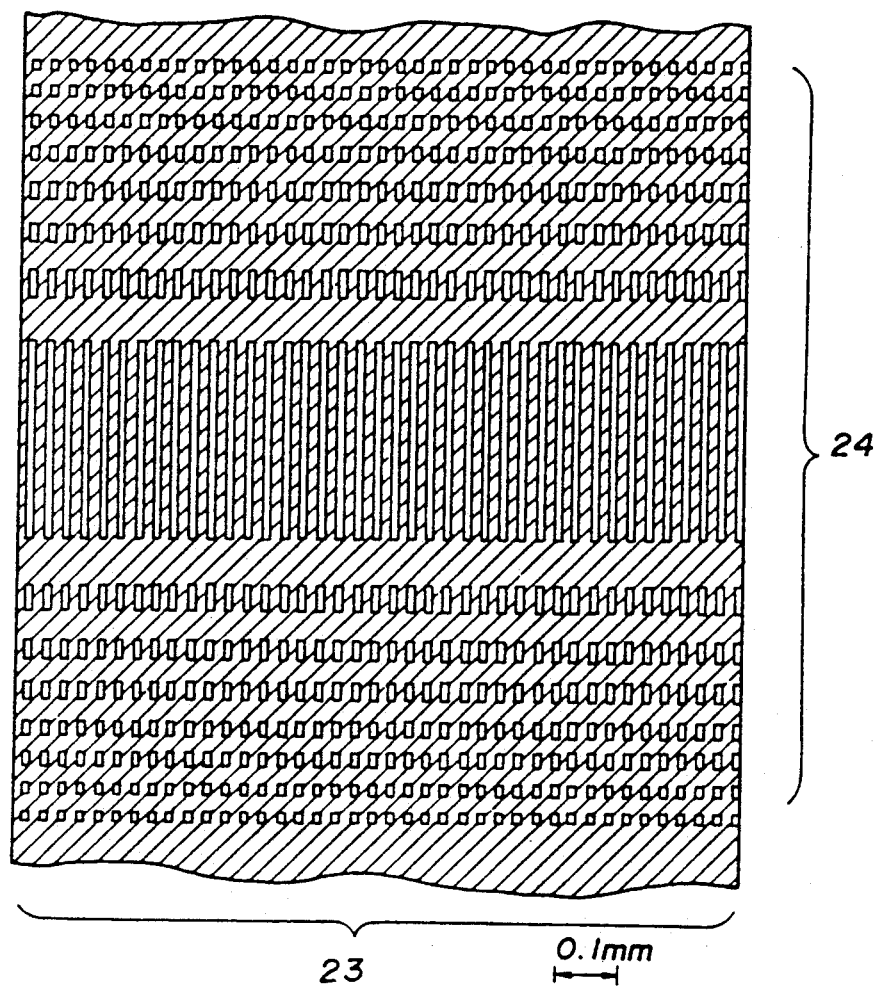
Figure 11:
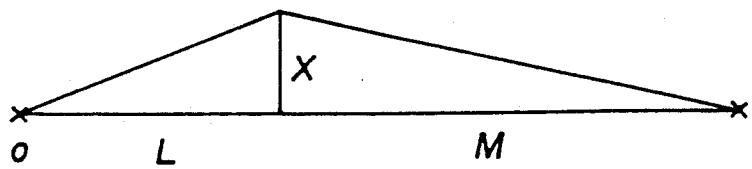

Next description is directed to the second aspect of the present invention in conjunction with FIGS. 9-11. FIG. 9 is a perspective view showing a rotary encoder according to the second aspect of the invention. The rotary encoder is provided with a point light source 21 for emitting a coherent primary light of diverging mode. The point light source 21 is composed, for example, of a semiconductor laser generating a coherent spherical wave light having wavelength of $\lambda = 830$ nm. A displacement member 22 is disposed the distance L from the point light source 21 to undergo an angular displacement across a part of the divergent primary light. The displacement member 22 is composed of a rotary disc. A one-dimensional diffractive pattern 23 is formed on the rotary disc. The diffractive pattern 23 is comprised of a plurality of radial slits arranged by the pitch T along the displacement direction of the rotary disc, i.e., the circumferential direction of the rotary disc. Further, a planar holographic lens pattern 24 is also formed on the same face of the rotary disc in superposed relation to the one-dimensional diffractive pattern. The holographic lens pattern 24 is comprised of a plurality of coaxial circular slits arranged by given intervals in a direction perpendicular to the displacement direction, i.e., in the radial direction of the disc. The one-dimensional diffractive pattern 23 operates to diffract the primary light or divergent incident light to form an enlarged interference image having an enlarged pitch of interference fringe at the given distance M in the axial direction. This interference image has bright and dark alternate bands and shifts in response to the angular displacement of the disc. On the other hand, the holographic lens pattern 24 converges the secondary light, i.e., the diffracted light only in the radial direction to thereby avoid variation in pitch of the interference image along the circumferential direction. A stationary mask plate 25 is disposed on an image plane of the interference image. The mask plate 25 is formed with a single of or a plurality of slot having a spatial frequency corresponding to the pitch of the interference image. Consequently, the mask plate 25 is utilized as a spatial filter effective to selectively pass the shifting interference image. A photodetector 26 is disposed immediately behind the stationary mask plate 25 to receive the filtered interference image so as to produce an AC detection signal corresponding to periodical change in the received light intensity. The AC detection signal has a frequency indicative of rotation speed of the rotary disc 22 and has a number of peaks indicative of angular displacement amount of the rotary disc. The photodetector 26 receives the secondary light converged only in the radial direction of the disc, i.e., a direction orthogonal to the displacement direction so as to improve the receiving efficiency of the secondary light.

FIG. 10 is an enlarged partial plan view of the rotary disc 22, showing slit arrangement of the one-dimensional diffractive pattern 23 and the holographic lens pattern 24. As shown in the figure, the one-dimensional diffractive pattern 23 is comprised of a plurality of slits arranged by the constant pitch T along the displacement direction of the disc, i.e., in the horizontal direction in the figure. This pitch T is set to 30 $\mu$m at radially central portion of the diffractive pattern.

On the other hand, the holographic lens lattice 24 is comprised of a plurality of slits arranged by a varying interval along the radial direction, i.e., vertical direction in the figure. These horizontal and vertical slits can be formed concurrently on the same face of the rotary disc composed of glass substrate by fine photolithography and etching technology.

FIG. 11 is an illustrative diagram showing the operation of the holographic lens pattern. In the figure, L denotes the distance between the light source O and the rotary disc, and M denotes the distance between the rotary disc and the interference image plane. Further, X denotes a radius of each ring slit of the holographic lens pattern. The value X is properly set for each ring slit so as to enable the respective diffracted light components passing through the corresponding ring slits to intensively interfere with each other on the image plane to thereby effect conversion of the light in the radial direction. In this case, the converging effect is obtained only in the radial direction of the ring slits, but not obtained in the circumferential direction of the ring slits. Therefore, the holographic lens pattern functions in manner similar to a regular solid type cylindrical lens piece. It could be possible to insert such cylindrical lens piece between the rotary disc and the interference image plane in place of the inventive holographic lens pattern so as to effect converging of the secondary light; however, such structure would be disadvantageous in view of increase in component numbers and in adjusting steps.

In order to enable the holographic lens pattern to effect a desired converging of the light on a given interference image plane, the following relation (7) must be satisfied:

$$\sqrt{L^2 + X^2} + \sqrt{M^2 + X^2} = 2\pi(K_0 + I)\lambda \quad (7)$$

where I denotes an integer and $K_O$ denotes a constant. When $I=O$, X is set to zero, i.e., $X=O$. Therefore, the relation (7) is transformed into $L+M=2\pi K_O\lambda$. Thus, the constant $K_O$ is determined by $$K_0 = \frac{L + M}{2\pi\lambda}.$$

Since approximately it is held that $X < L$ and $X < M$, the relation (7) is approximated to the following relation (8):

$$X = \sqrt{\frac{4\pi L M \lambda}{L + M}} \cdot I \quad (8)$$

For example, when the pitch T of the one-dimensional diffractive pattern is set to $T=30$ μm and the wavelength λ of primary light is set to $\lambda=830$ nm in this embodiment, the distance L is calculated to $L=6$ mm and the other distance M is calculated to $M=55$ mm according to the before-mentioned relation (1). By utilizing these values of L and M, the value of X can be calculated for each number of I according to the relation (8), the results of which are represented in the following table:

TABLE

| I | 0 | 1 | 2 | 3 | 4 | 5 | 6 | 7 | — |
|---|---|---|---|---|---|---|---|---|---|
| X(mm) | 0 | 0.238 | 0.336 | 0.411 | 0.475 | 0.531 | 0.582 | 0.628 | — |

FIG. 10 shows an example of the holographic lens pattern formed with the varying intervals listed in the above table.

The such type of the holographic lens pattern has an optical collecting efficiency E defined by the following relation (9):

$$E = \left(\frac{2X}{L}\right)/(D/(L + M))/2 \quad (9)$$

where D denotes an effective light receiving dimension of the photodetector. When the value D is set to $D=1$ mm and the value X is set to $X=\pm 0.6$ mm, the optical collecting efficiency E is calculated to $E=6.1$ by using the relation (9) where L is set to 6 mm and M is set to 55 mm. Namely, the secondary light from the diffractive pattern can be efficiently collected about 6 times as great as the case without the holographic lens pattern.

Figure 12:
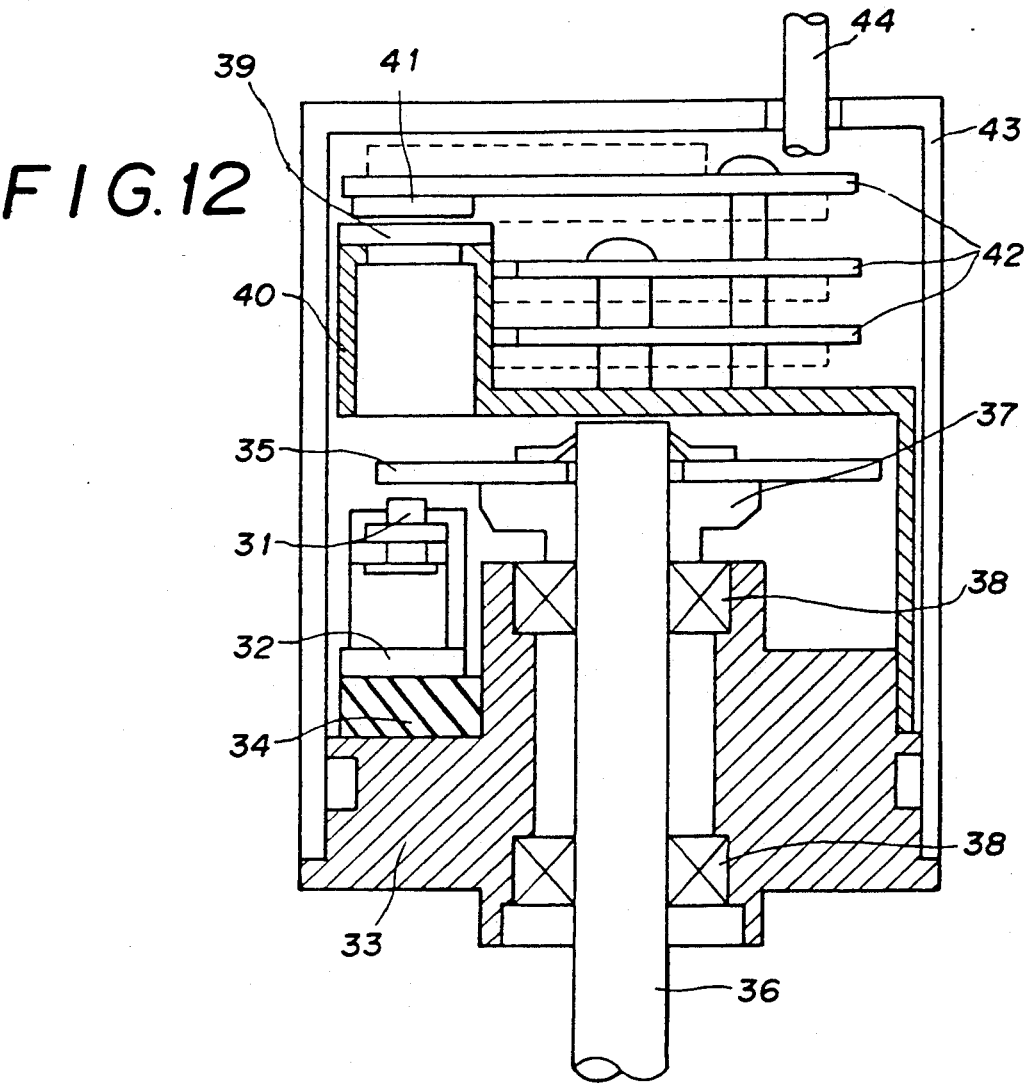

Referring to FIG. 12, next description is given for construction of a complete unit of the laser rotary encoder assembled into a cylinder casing. The laser encoder unit is provided with a light source in the form of a laser diode 31 for emitting a coherent light beam having a temperature-dependent wavelength. The laser diode 31 is mounted in a holder 32. A compensative member 34 is interposed between a bottom of the holder 32 and a base 33. The base 33 is composed, for example, of metal such as aluminium and the compensative member 34 is composed, for example, of plastic material. The compensative member has a linear thermal expansion coefficient significantly greater than that of the base material so as to effect efficient compensation of wavelength for ambient temperature. The plastic material can be composed, for example, of polybutyleneterephthalate.

An encoder plate or disc 35 is disposed in the optical axis a distance L from the laser diode 31. The encoder disc 35 is fixed to one end of a rotational shaft 36 and angularly displaces transversely of the optical axis with the rotation of shaft 36. One-dimensional diffractive grating or pattern is formed on a periphery of the disc 35 along its circumferential direction. This diffractive grating diffracts a coherent incident light beam to form an interference image forwardly of the optical axis. This interference image shifts according to the angular displacement of the encoder disc 35. The shaft 36 is attached with a rotor bush 37 at its one end and is rotatably assembled into the base 33 through a pair of bearings 38.

A mask plate in the form of a spatial grating 39 is disposed in the optical axis a distance M forwardly from the encoder disc 35. The spatial grating 39 is supported by a support member 40 so as to filter the interference image. A photodetector 41 in the form of a photodiode etc. is disposed adjacently to the spatial grating 39. The photodetector 41 receives the filtered interference image to output a corresponding electric signal. A processor 42 processes the electric signal to output an encoder output indicative of angular displacement of the encoder disc 35. These components are assembled with each other as described above, and then are stored into a cylinder casing 43. The casing 43 receives a cable 44 for external electrical connection to effect transmission of the encoder output and supply of electric power.

Figure 13:
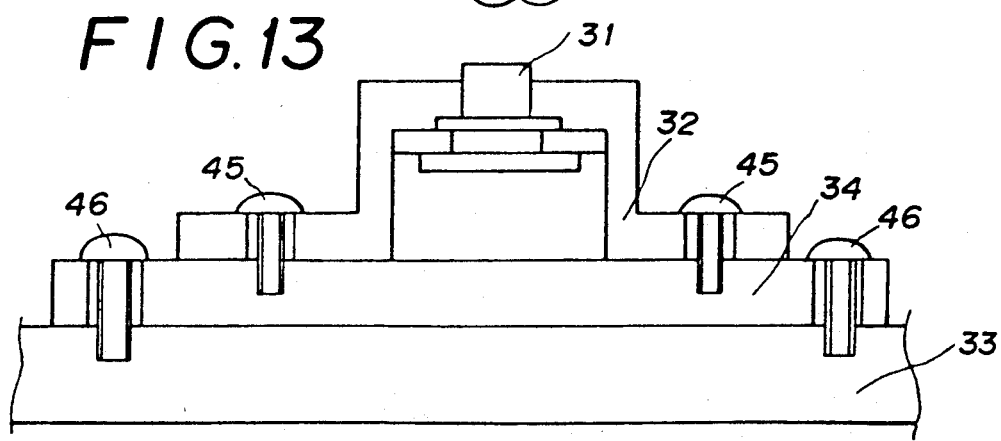

FIG. 13 is a sectional view showing the laser diode mount structure in the FIG. 12 unit. As shown, the laser diode 31 is mounted on the holder 32. The holder 32 is fixed at its bottom periphery to the compensative member 34 by means of a pair of screws 45. Further, the compensative member 34 is fixed to the base 33 by means of another pair of screws 46. By such construction, when the compensative member 34 undergoes thermal expansion and contraction in its thickness direction dependently on the ambient temperature, the laser diode 31 accordingly undergoes a displacement in the optical axis direction. Consequently, the optical distance L can be regulated in response to the ambient temperature between the laser diode 31 and the encoder disc 35.

Figure 14:
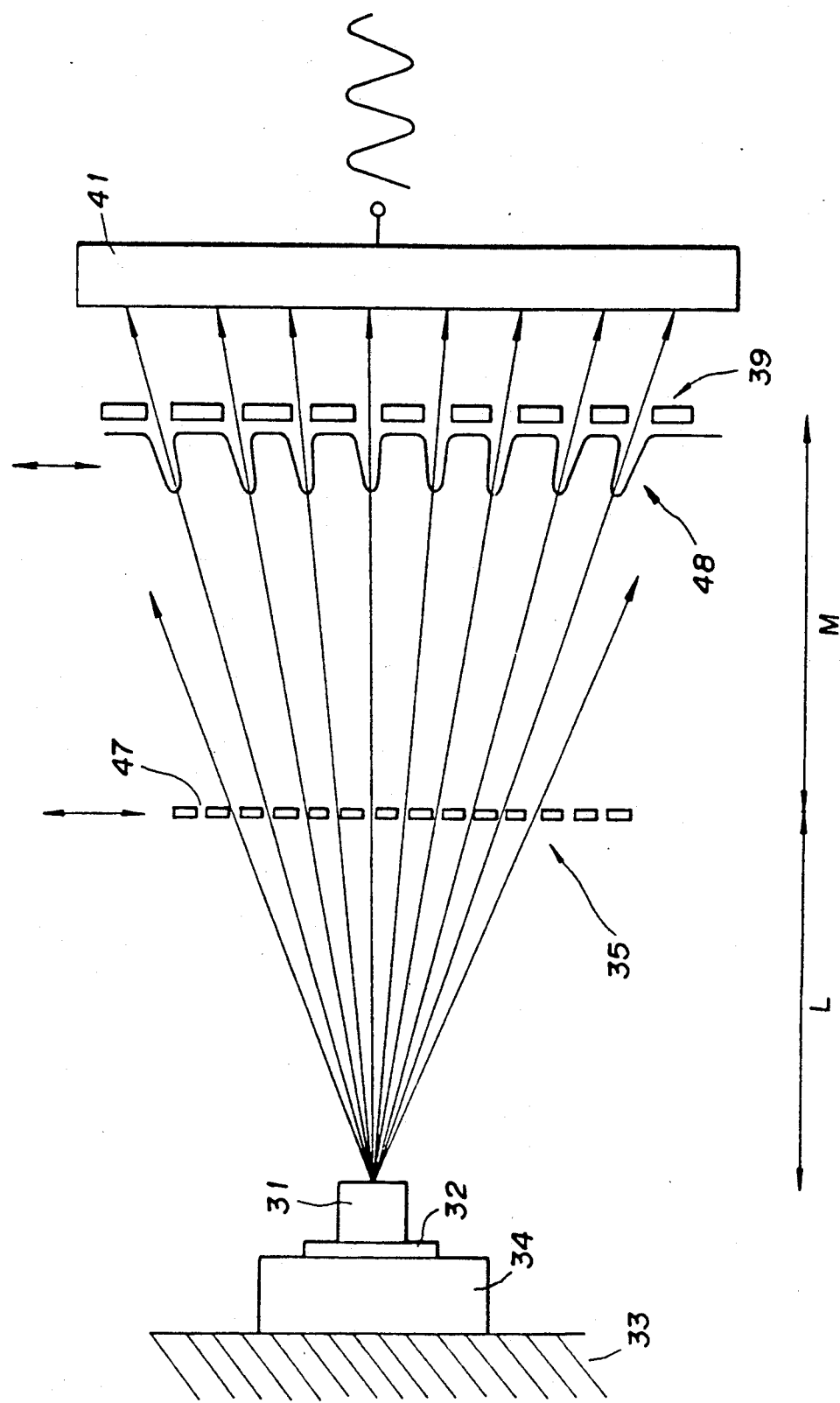

FIG. 14 is an illustrative sectional view showing the operation of the laser encoder complete unit. As shown, the laser encoder unit has the point light source 31 for emitting the coherent light. The encoder disc 35 is disposed at the first optical path length L forwardly from the point light source 31 to undergo the displacement across the optical path. The encoder disc is formed with the one-dimensional diffractive grating or pattern 47. The diffractive grating 47 is irradiated with the coherent light to form the interference image 48 at the second optical path length M forwardly from the diffractive grating. The interference image 48 shifts as indicated by the double-headed arrow according to the displacement of the encoder disc 35 and has a particular spatial period of the interference fringe. The spatial grating 39 is disposed at the second optical path length M. The spatial grating 39 is arranged along the shift direction of the interference image 48 and has a spatial period corresponding to that of the interference image 48. The photodetector 41 is disposed immediately behind the spatial grating 39 to receive the light passing through the spatial grating 39 to thereby output an AC detection signal corresponding to periodic change in the light intensity of the received light. The detection signal has a frequency indicative of displacement velocity of the encoder disc 35, and has a number of wave peaks indicative of displacement amount of the encoder 35.

The inventive laser encoder unit of the type utilizing the point light source diffraction operates such that the moving diffractive grating 47 is irradiated with the coherent light emitted from the point light source 31 to produce the diffracted light and the photodetector 41 receives the diffracted light through the spatial grating 39. In such operation, the before-mentioned relation (1) must be satisfied according to Fresnel diffraction theory in order to form the clear interference image 48 by the diffracted light. When the relation (1) is held in the encoder unit, the clear interference image is obtained and it shifts in response to the displacement of the encoder disc 35. Further, as described before, the relation (2) is held between the pitch T of the diffractive grating 47 and the period of interference image 48, i.e., the pitch P of the interference fringe. Namely, the pitch P of the interference fringe is enlarged relative to the pitch T of the diffractive grating by multiplication factor M + L/L. The enlargement rate can be increase setting the second optical path length M far greater than the first optical path length L so as to obtain a laser encoder having good performance and high resolution power.

It is practically necessary to maintain the second optical path length M at constant among various parameters contained in the relation (1) in order to fix the position of the interference image plane. Practically, the wavelength λ of incident light varies dependently on the ambient temperature. Therefore, the first optical path length L is adjusted to cancel out this variation to thereby hold the relation (1) to fix the parameter M. For this purpose, the compensative member 34 is interposed between the point light source 31 and the base 33.

Generally, the laser diode of the light source 31 is covered with a protective glass film, which has, for example, a thickness of d=0.25 mm and a refractive index of n=1.51. In such case, the effective first optical path length L' is represented by the following relation (10):

$$L' = L - \left(1 - \frac{1}{n}\right)d \tag{10}$$

Accordingly, the parameter L should be replaced by the parameter L' in the relation (1), thereby the relation (1) being transformed into the following relation (11):

$$L - \left(1 - \frac{1}{n}\right)d = \frac{1}{\frac{C}{T^2}\lambda - \frac{1}{M}} \tag{11}$$

where C=(G/H).

Provided that $\lambda = \lambda_O + \Delta\lambda$ where $\lambda_O$ indicates a standard wavelength and $\Delta\lambda$ indicates a change amount of wavelength dependent on temperature, the value of $\Delta\lambda$ is far less than the value of $\lambda_O$ and therefore the relation (11) is approximated in the form of Tayler expansion as follows:

$$L - \left(1 - \frac{1}{n}\right)d \approx \frac{1}{\frac{C}{T^2}\lambda_0 - \frac{1}{M}}\left(1 - \frac{C/T^2}{\frac{C}{T^2}\lambda_0 - \frac{1}{M}} \cdot \Delta\lambda\right) \tag{12}$$

The relation (12) is calculated with setting the parameters $\lambda_O = 0.78 \times 10^{-3}$ mm, T=0.0055 mm, M=19.46 mm and C=1/32.9÷1/33 to obtain the following relation (13):

$$L - \left(1 - \frac{1}{n}\right)d = 1.3655(1 - 1372 \cdot \Delta\lambda) = 2.436 - 1372\lambda \tag{13}$$

Further, the parameter values n=1.51 and d=0.25 mm are introduced into the left side of the relation (13) to calculate L as shown in the following relation (14):

$$L = 1372\lambda + 2.52 \text{ (general form: } L = A\lambda + B) \tag{14}$$

Namely, when the first path length L and the wavelength λ of the coherent light satisfy the relation (14), the interference image is formed at the fixed second path length M=19.46 mm.

On the other hand, temperature-dependency of the oscillating frequency λ in the laser diode is expressed by the following general relation (15):

$$\lambda = \lambda_O - a \cdot \Delta t \tag{15}$$

where $\alpha$ denotes a wavelength variation coefficient and $\Delta t$ denotes a temperature change. With regard to the relation (15), a commercially available laser diode has typical parameter values such as $\lambda_0 = 0.78 \times 10^{-3}$ mm and $\alpha = 0.26 \times 10^{-6}$ mm/° C. These values are introduced into the relation (15) to obtain the following specific relation (16):

$$\lambda = 0.78 \times 10^{-3} - 0.26 \times 10^{-6} \Delta t \quad (16)$$

Then, the relation (16) is introduced into the relation (14) to obtain the following relation (17):

$$L \doteq 1.45 - 3.567 \times 10^{-4} \Delta t \quad (17)$$

In order to satisfy the relation (17), the compensative member should undergo thermal linear expansion of $+3.567 \times 10^{-4}$ mm per ° C. to cancel out the temperature-dependent wavelength variation. For example, the compensative member is composed of a polybutylene terephthalate plate having a linear expansion coefficient of $\beta = 9 \times 10^{-5}$ cm/° C. cm and a thickness of $S = 3.567 \times 10^{-4}/9 \times 10^{-5} = 3.96$ mm. The above calculation is expressed in the general form as follows:

$$S = \frac{\alpha \cdot A}{\beta} \quad (18)$$

The compensative member is not necessarily formed of polybutylene terephthalate, but may be composed of plastic material having linear expansion coefficient significantly greater than that of the base material.

It might be advisable to take into account of change in temperature-dependent dimension of the base 33 and casing 43 in order to achieve more accurate compensation for the ambient temperature.

Figure 15:
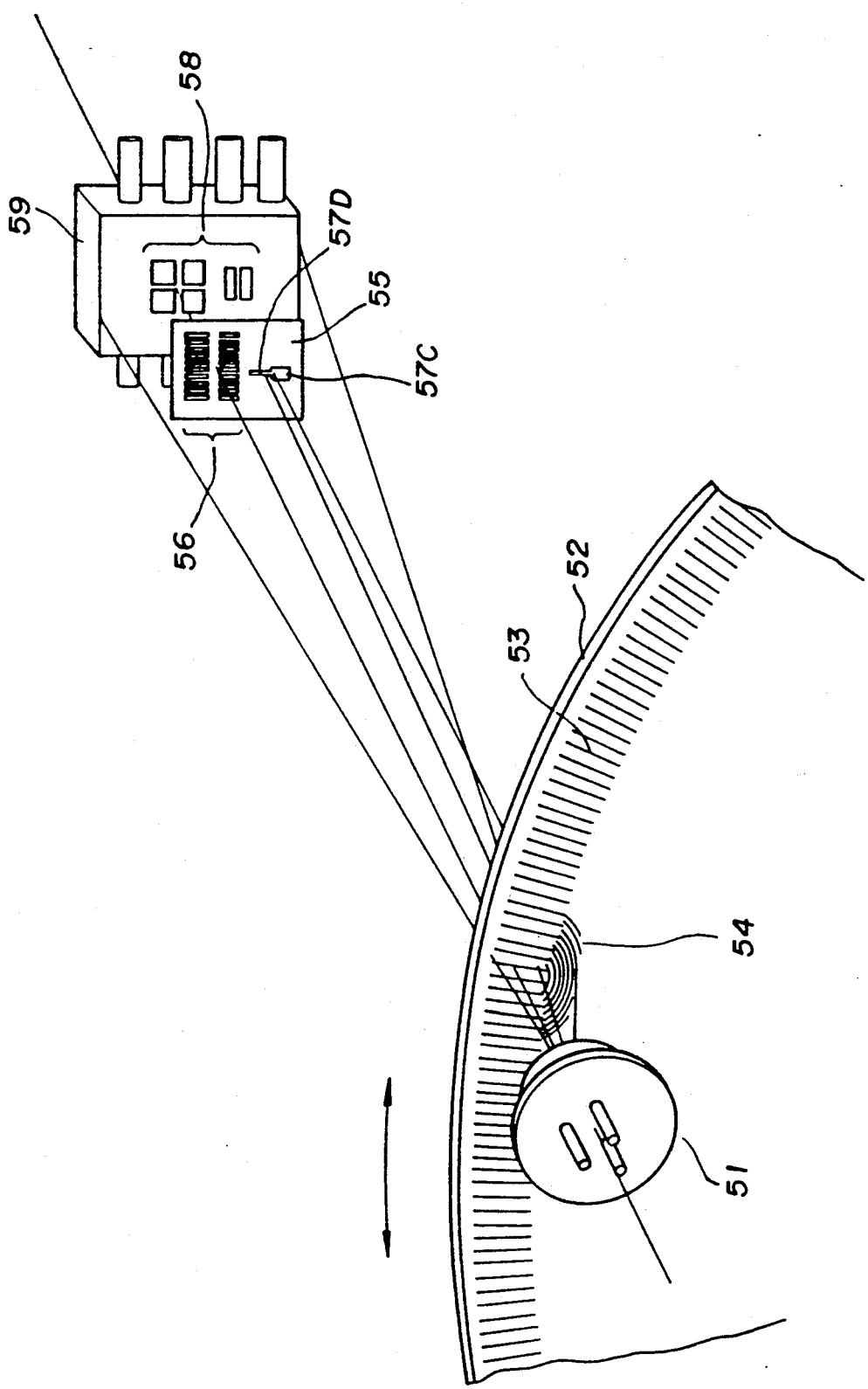

FIG. 15 shows one expedient of the laser rotary encoder according to the first aspect of the present invention. The laser rotary encoder has a fixed light source 51. The fixed light source 51 is composed of a semiconductor laser for producing a coherent incident light beam. However, its wavelength tends to vary in response to temperature change and other factors. A rotary encoder disc 52 is disposed in front of the fixed light source 51. The encoder disc 52 is displaceable angularly in opposite directions as indicated by the double headed arrow to traverse the incident light beam. A one-dimensional diffractive grating or pattern 53 is formed along an annular periphery of the encoder disc 52. The grating 53 is arranged along the displacement direction and continuously diffract the incident light beam to form an interference image a given distance from the disc. The interference image is equivalent to an enlarged projection of the one-dimensional diffractive grating 53 so that the interference image shifts in response to the displacement of encoder disc 52. An optical reference element is formed at a reference position of the encoder disc 52. In this embodiment, the optical reference element is comprised of a local holographic lens pattern 54 adjacent to the one-dimensional diffractive grating 53. The holographic lens pattern 54 is composed of a plurality of coaxial ring slits. Each time the ring slits pass across the incident light beam, the holographic lens produces a secondary light beam effective to form a reference spot image forwardly a given distance. A pitch of the holographic ring slits is suitably set to intensively diffract the incident light beam to produce the spot image having a sharp peak due to interference. The spot image plane is set identical to the interference or diffraction image plane. As described, the holographic lens pattern 54 utilizes diffraction and interference of the coherent incident light beam, hence the performance thereof depends on the wavelength of incident light beam similarly to the one-dimensional diffractive grating 53 so that a peak intensity of the spot image varies according to change in the wavelength.

A mask plate 55 is disposed in the co-image plane of the interference fringe and the reference spot. The mask plate 55 is formed with a plurality of spatial filters 56 having a spatial period corresponding to a pitch of the interference fringe. Further, a pair of wide slot 57C and narrow slot 57D having wide and narrow opening widths, respectively, are formed on the mask plate 55 in registration with the spot image position. The wide slot 57C and narrow slot 57D are disposed adjacently to each other to pass the spot image concurrently and dividedly.

A plurality of photodetectors 58 are disposed immediately behind the mask plate 55 in opposed relation thereto. The plurality of photodetectors 58 include one photodetector receptive of the secondary light beam through the wide slot 57C to output a comparative pulse signal having a wide pulse width, and another photodetector receptive of the secondary light beam through the narrow slot 57D to output a detection pulse signal having a narrow pulse width. Further, there are included other photodetectors receptive of the secondary light beam through the spatial filters 56 to produce corresponding AC detection signals. The plurality of photodetectors 58 are contained in a detection circuit 59. The detection circuit 59 operates to compare and evaluate the detection pulse signal with respect to the comparative pulse signal to threshold and shape the detection pulse signal to thereby produce a reference pulse signal indicative of passage of the encoder disc reference point.

Figure 16:
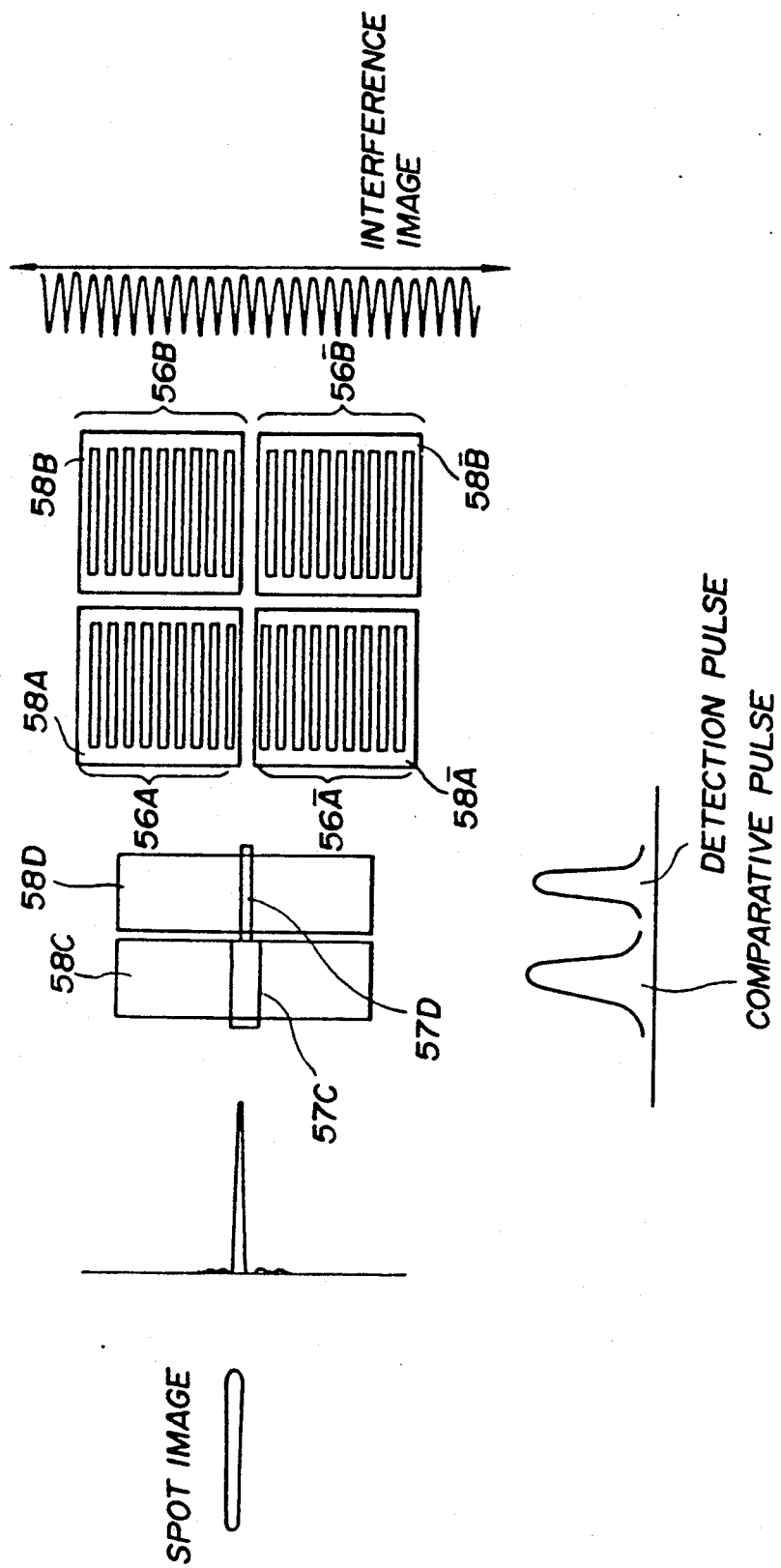

FIG. 16 is an illustrative diagram showing relative arrangement between the mask plate 55 and the photodetectors 58. The spot image is indicative of the reference point of the encoder disc and has a quite sharp peak intensity due to strong converging effect of the holographic lens pattern. The spot image is formed in an elongated shape having a very small width in the displacement direction of the encoder disc, but having a relatively great length in a direction orthogonal to the displacement direction to thereby cover total length of the wide slot 57C and narrow slot 57D. The narrow slot 57D has a quite narrow opening width in accurate registration with the spot image position so as to detect the reference point of the encoder disc with high resolution power. On the other hand, the wide slot 57C has a relatively wide opening width in order to produce a comparative pulse signal. A photodetector 58C is disposed behind the wide slot 57C, and another photodetector 58D is disposed behind the narrow slot 57D. The pair of photodetectors 58C and 58D are arranged correspondingly to the respective one of the wide slot 57C and narrow slot 57D so as to concurrently and equidividedly receive the spot image. The photodetector 58C receives the secondary light beam through the wide slot 57C to produce the comparative pulse signal having a wide pulse duration, and the other photodetector 58D receives the secondary light beam through the narrow slot 57D to produce the detection pulse signal having a narrow pulse duration. The comparative pulse signal occurs concurrently with the detection pulse signal and covers the detection pulse signal.

On the other hand, the one-dimensional diffractive grating forms the interference fringe image having continuous peaks which shift in either of the bidirections as indicated by the double-headed arrow. A pair of spatial filters 56A and 56$\overline{\text{A}}$ are arranged adjacently along the shift direction of the interference image. These spatial filters 56A and 56$\overline{\text{A}}$ have the same spatial period which corresponds to the fringe pitch of the interference image, but they have a relative phase difference by 180°. Another pair of spatial filters 56B and 56$\overline{\text{B}}$ are arranged in parallel to the pair of spatial filters 56A and 56$\overline{\text{A}}$. These spatial filters 56B and 56$\overline{\text{B}}$ have also the same spatial period which corresponds to the fringe pitch of the interference image, but they have a relative phase difference by 180°. Further, there is a phase difference of 90° between the pair of filters 56A and 56$\overline{\text{A}}$ and the other pair of filters 56B and 56$\overline{\text{B}}$. This phase difference of 90° is designed to enable detection of the shift direction of the interference image. Four photodetectors 58A, 58$\overline{\text{A}}$, 58B and 58$\overline{\text{B}}$ are disposed correspondingly to respective one of the four spatial filters 56A, 56$\overline{\text{A}}$, 56B and 56$\overline{\text{B}}$.

Figure 17:
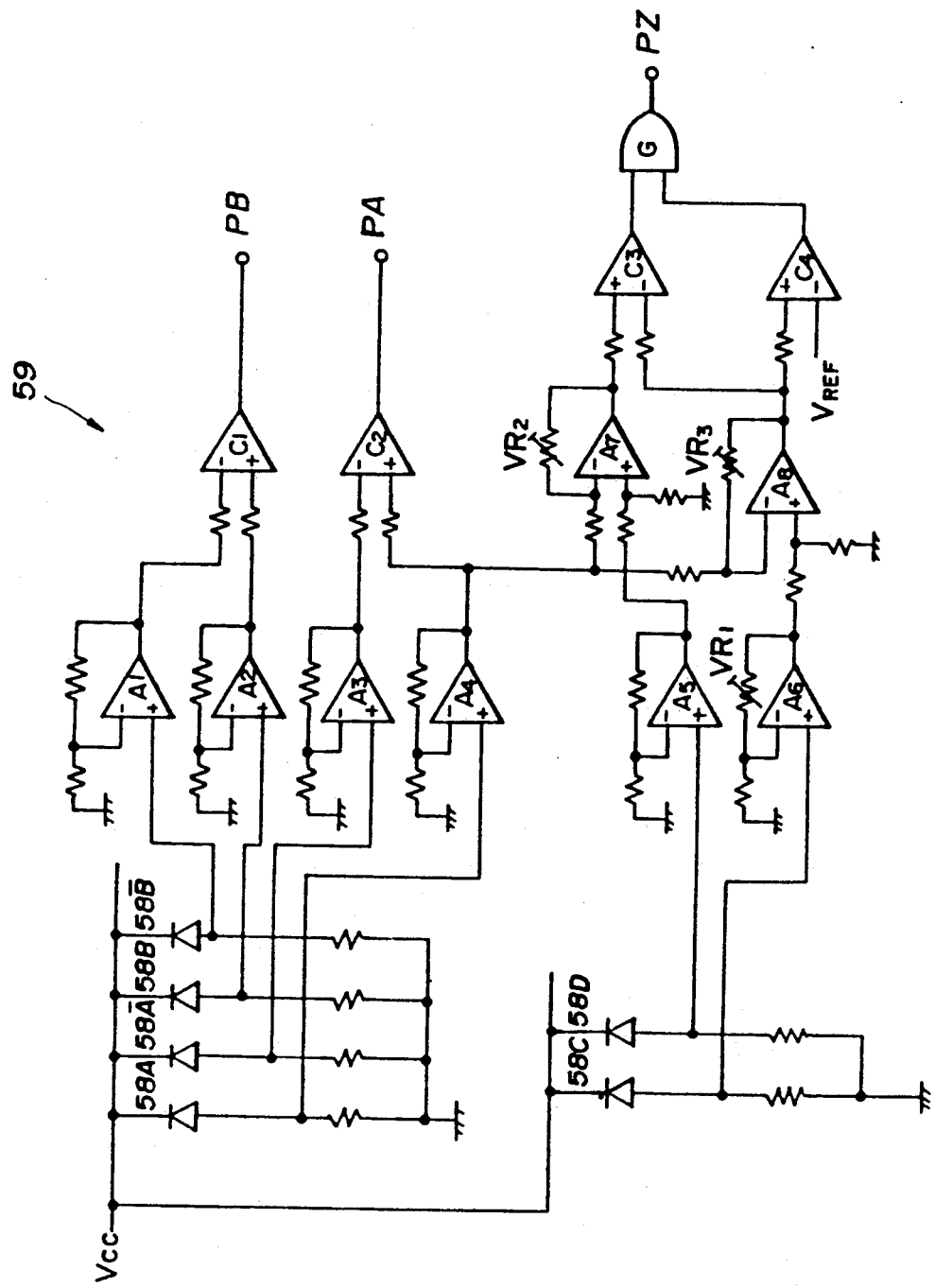

FIG. 17 is a block diagram showing a detailed circuit structure of the detection circuit 59. An amplifier A1 is connected to the photodetector 58$\overline{\text{B}}$, an amplifier A2 is connected to the photodetector 58B, an amplifier A3 is connected to the photodetector 58$\overline{\text{A}}$, and an amplifier A4 is connected to the photodetector 58A. Further, an amplifier A5 is connected to the photodetector 58D, and an amplifier A6 is connected to the photodetector 58C and is controlled its amplification rate by a variable resistor VR1. A comparator C1 is connected to output terminals of the amplifiers A1 and A2, and a comparator C2 is connected to output terminals of the amplifiers A3 and A4. A differential amplifier A7 is connected to output terminals of the amplifiers A4 and A5 and is controlled its input level by a variable resistor VR2. In similar manner, a differential amplifier A8 is connected to output terminals of the amplifiers A4 and A6 and is controlled its input level by a variable resistor VR3. Further, a comparator C3 is connected to output terminals of the amplifiers A7 and A8, and another comparator C4 is connected to the output terminal of the amplifier A8. The comparator C4 carries out comparing operation based on a preset voltage level $v_{REF}$. Lastly, a gate circuit G composed of an AND gate is connected to output terminals of the comparators C3 and C4.

Figure 18:
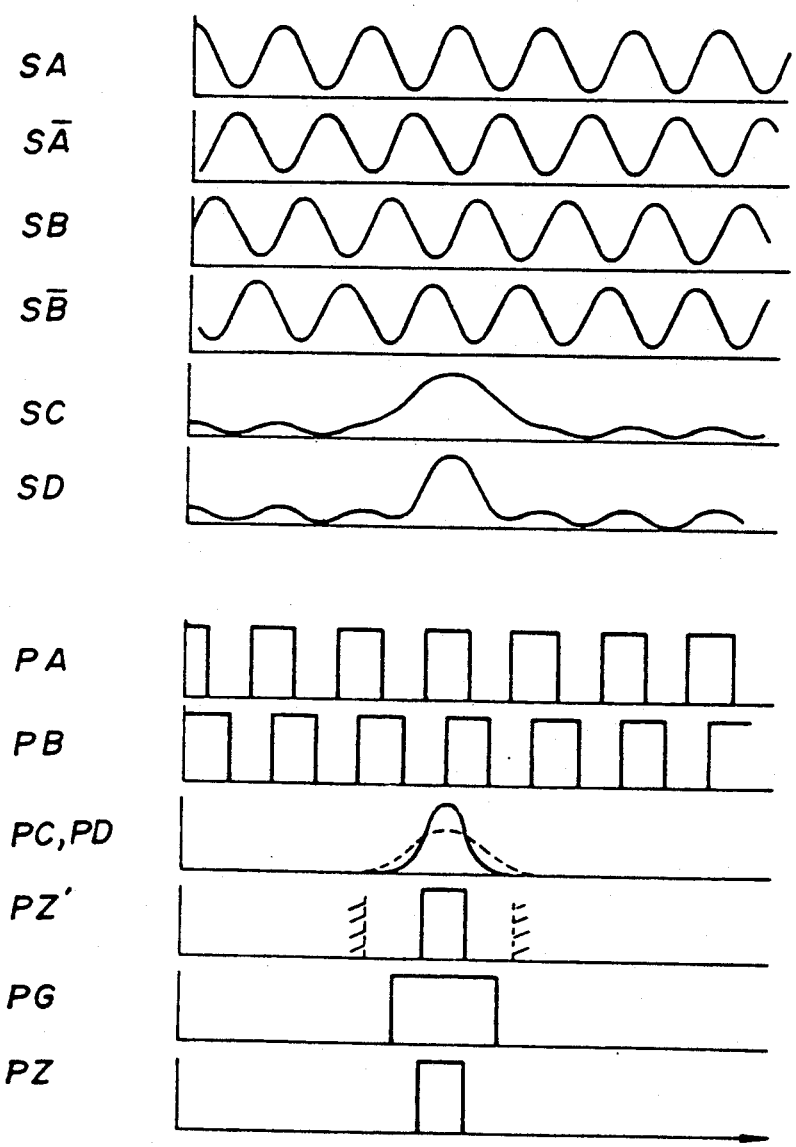

FIG. 18 shows various waveforms of signals appearing in the FIG. 17 circuit. The description is given for operation of the FIG. 15 laser encoder in conjunction with FIG. 18. The photodetector 58A outputs an A-phase AC detection signal SA, and the photodetector 58$\overline{\text{A}}$ outputs an $\overline{\text{A}}$-phase detection signal S$\overline{\text{A}}$ of the opposite phase having 180° phase difference relative to the signal SA. This phase difference corresponds to the spatial phase difference between the pair of spatial filters 56A and 56$\overline{\text{A}}$. In similar manner, the photodetector 58B outputs a B-phase AC detection signal SB, and the photodetector 58$\overline{\text{B}}$ outputs a $\overline{\text{B}}$-phase AC detection signal S$\overline{\text{B}}$ of the opposite phase. Further, the photodetector 58C outputs the comparative pulse signal SC. The comparative pulse signal SC contains a comparative pulse component of wide pulse width and a noise component due to the interference image. The photodetector 58D outputs the detection pulse signal SD which contains a detection pulse component of narrow pulse width and a similar noise component. The comparative pulse component and the detection pulse component have the coincident peak position with each other and have substantially the same pulse height because the spot image is concurrently and dividedly received by the photodetectors 58C and 58D. However, the comparative pulse has a width greater than that of the detection pulse.

The A-phase AC detection signal SA and the $\overline{\text{A}}$-phase AC detection signal S$\overline{\text{A}}$ are amplified by the respective amplifiers A3 and A4, and thereafter are compared to each other by the comparator C2 to produce an A-phase displacement signal PA. The A-phase displacement signal PA is composed of a train of square pulses, and the number of pulses indicates the displacement amount of the encoder disc. Similarly, the B-phase AC detection signal SB and the $\overline{\text{B}}$-phase AC detection signal S$\overline{\text{B}}$ are amplified by the respective amplifiers A1 and A2, and then are compared to each other in the comparator C1 to produce a B-phase displacement signal PB. The B-phase displacement signal PB is also composed of a train of square pulses. However, the B phase displacement signal PB has a phase difference of 90° relative to the A-phase displacement signal PA correspondingly to the spatial phase difference of 90° between the pair of spatial filters 56A, 56$\overline{\text{A}}$ and the other pair of spatial filters 56B and 56$\overline{\text{B}}$. This phase difference is of delay or advance nature dependently on the displacement direction of the encoder disc. Namely, the displacement direction can be detected in terms of relative phase relation between the A-phase displacement signal and the B-phase displacement signal.

The detection pulse signal SD is amplified by the amplifier A5, and then is shaped by the differential amplifier A7 to remove the noise component to produce a detection pulse PD. On the other hand, the comparative pulse signal SC is amplified by the variable amplifier A6, and then is shaped by the differential amplifier A8 to remove the noise component to produce a comparative pulse PC. At this time, an amplification rate of the variable amplifier A6 is tuned lower than that of the amplifier A5 so that the amplifier A8 outputs the shaped comparative pulse PC having a peak voltage level lower than that of the shaped detection pulse PD outputted from the amplifier A7. Consequently, the shaped comparative pulse PC can be directly used as a threshold voltage level to evaluate the shaped detection pulse PD. Namely, the comparator C3 directly receives the detection pulse PD and the comparative pulse PC to compare with each other to thereby produce a reference pulse signal PZ.

However, as shown in the figure, the output waveform PZ' of the comparator C3 contains not only the reference pulse signal PZ but also may contain an indefinite noise component. Namely, when the encoder disc is stopped or the reference point thereof displaces away from the incident light beam, the outputs of the amplifiers A7 and A8 are held unstable so that the comparator C3 falls in the unstable state. Consequently, the comparator C3 may produce a noise pulse due to disturbance. In order to remove such unstable factor in the operation of the comparator C3, the output signal of the amplifier A8 is compared with a predetermined voltage level $V_{REF}$ in the comparator C4 to form a gate pulse signal PG. As shown, the gate pulse signal PG is composed of a square pulse having a relatively wide pulse width The gate circuit G is opened in response to the gate pulse signal PG to selectively pass the reference pulse signal PZ to form a final Z-phase signal. Lastly, though not shown in the figure, the A-phase displacement signal PA, the B-phase displacement signal PB and the Z-phase signal PZ are processed by a computer to provide information as to absolute angular displacement and displacement direction of the encoder disc.

The present embodiment relates to the laser rotary encoder; however, the present invention is not limited to the rotary type, but may be applied to a laser linear encoder. The present embodiment utilizes a light source in the form of a semiconductor laser for emitting a coherent light beam, and a one-dimensional diffractive grating; however, the invention can be applied to the optical displacement detection device of the type composed in combination of a light emitting diode, slit plate and a photodetector. Further, the wide slot is composed of a single slot in this embodiment, but may be composed of a group of narrow slots. In this embodiment, a single of the holographic lens grating is used as a reference optical element; however, a pair of adjacent holographic lens gratings may be used to separately form a pair of spot images to respective narrow and wide slots. Otherwise, an additional birefringence optical element may be inserted between a single of the holographic lens grating and the mask plate to divide the spot image into two parts which are detected by the respective photodetectors 58C and 58D. Further, a cylindrical lens or a parallel plate angled relative to the optical axis may be inserted between the holographic lens grating and the mask plate to impart aberration to the spot image in the direction orthogonal to the displacement direction of the encoder plate to elongate the shape of the spot image. Lastly, the holographic lens grating can be replaced by a single slit so as to constitute a reference optical element.

Figure 19:
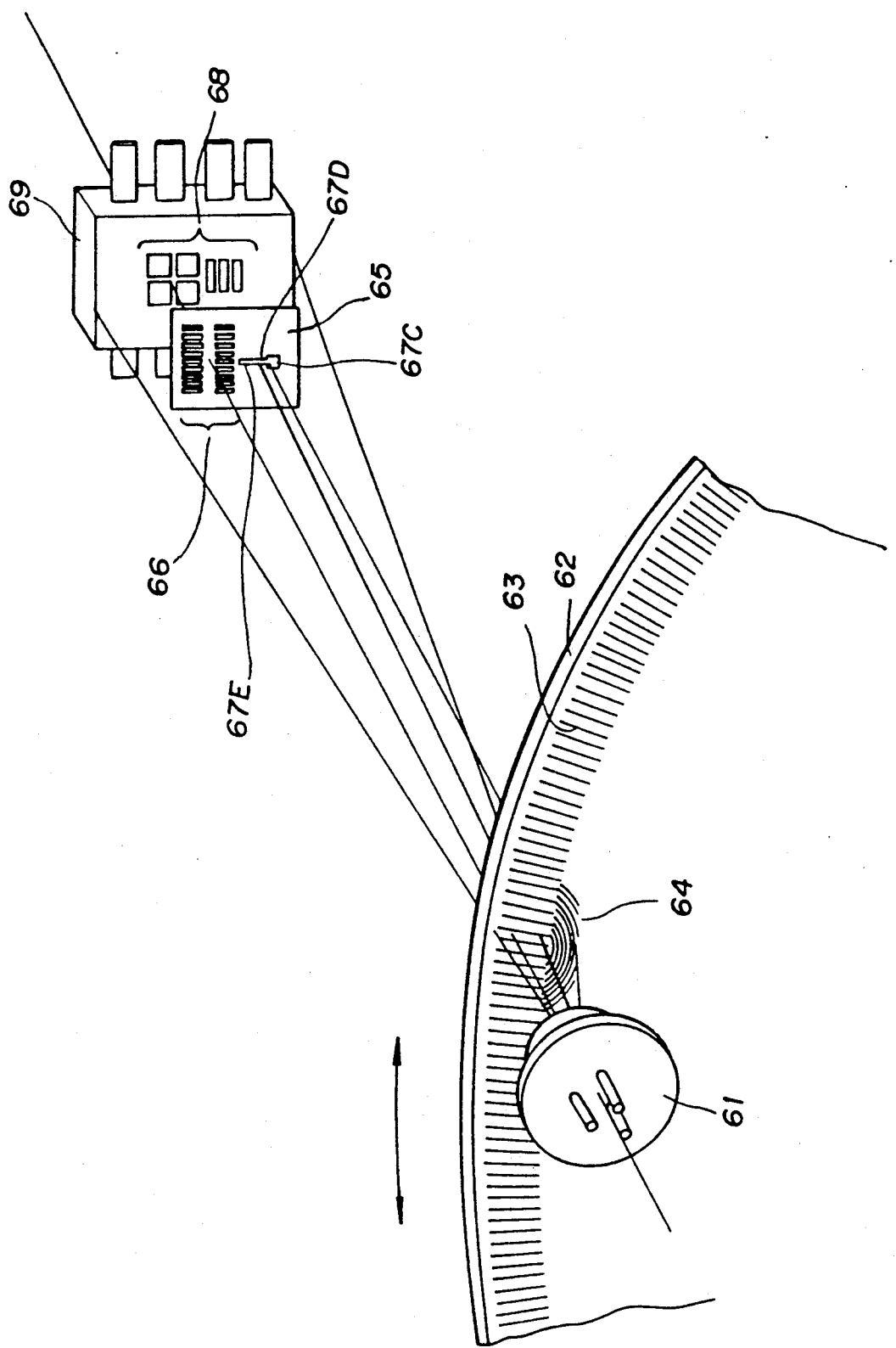

FIG. 19 shows another expedient of the laser rotary encoder according to the first aspect of the present invention. The laser rotary encoder has a fixed light source 61. The fixed light source 61 is composed of a semiconductor laser for producing a coherent incident light beam of spherical wavefront. A rotary encoder disc 62 is disposed in front of the fixed light source 61 displaceably angularly in opposite directions to traverse the incident light beam. A one dimensional diffractive grating or pattern 63 is formed along an annular periphery of the encoder disc 62. The grating 63 is composed of slits arranged along the displacement direction at a given pitch and continuously diffract the incident light beam to form an interference image a given distance from the disc. The interference image is equivalent to an enlarged projection of the one-dimensional diffractive grating 63 so that the interference image shifts in response to the rotation of encoder disc 62. A holographic lens pattern 64 is formed locally at a reference position of the encoder disc 62 adjacently to the one-dimensional diffractive grating 63. The holographic lens pattern 64 is composed of a plurality of coaxial ring slits such that its center coincides with the reference point of disc 62. Each time the ring slits pass across the incident light beam, the holographic lens pattern produces a diffracted secondary light beam effective to form a spot image forwardly a given distance on the interference or diffraction image plane. Namely, the spot image occurs at a given place each time the local holographic lens pattern 64 traverses the incident light beam.

A stationary mask plate 65 is disposed in the co-image plane of the interference fringe and the reference spot. The mask plate 65 is formed with a plurality of spatial filters 66 having a spatial period corresponding to a pitch of the interference fringe. Further, a pair of wide slot 67C and narrow slot 67D having wide and narrow opening widths, respectively, are formed on the mask plate 65 in registration with the spot image position. Moreover, a dummy slot 67E is formed on the mask plate 65, and it extends from the narrow slot 67D outside the spot image position. The wide slot 67C, narrow slot 67D and dummy slot 67E are disposed linearly along a direction orthogonal to the shift direction of the interference image. The dummy slot 67E has a relatively narrow opening width substantially identical to that of the narrow slot 67D. In addition, the narrow slot 67D and the dummy slot 67E may be composed of a single elongated opening. A plurality of photodetectors 68 are disposed immediately behind the mask plate 65 in registration with the respective ones of the spatial filters and slots formed on the mask plate. These photodetectors 68 are stored in a detection circuit 69.

Figure 20:
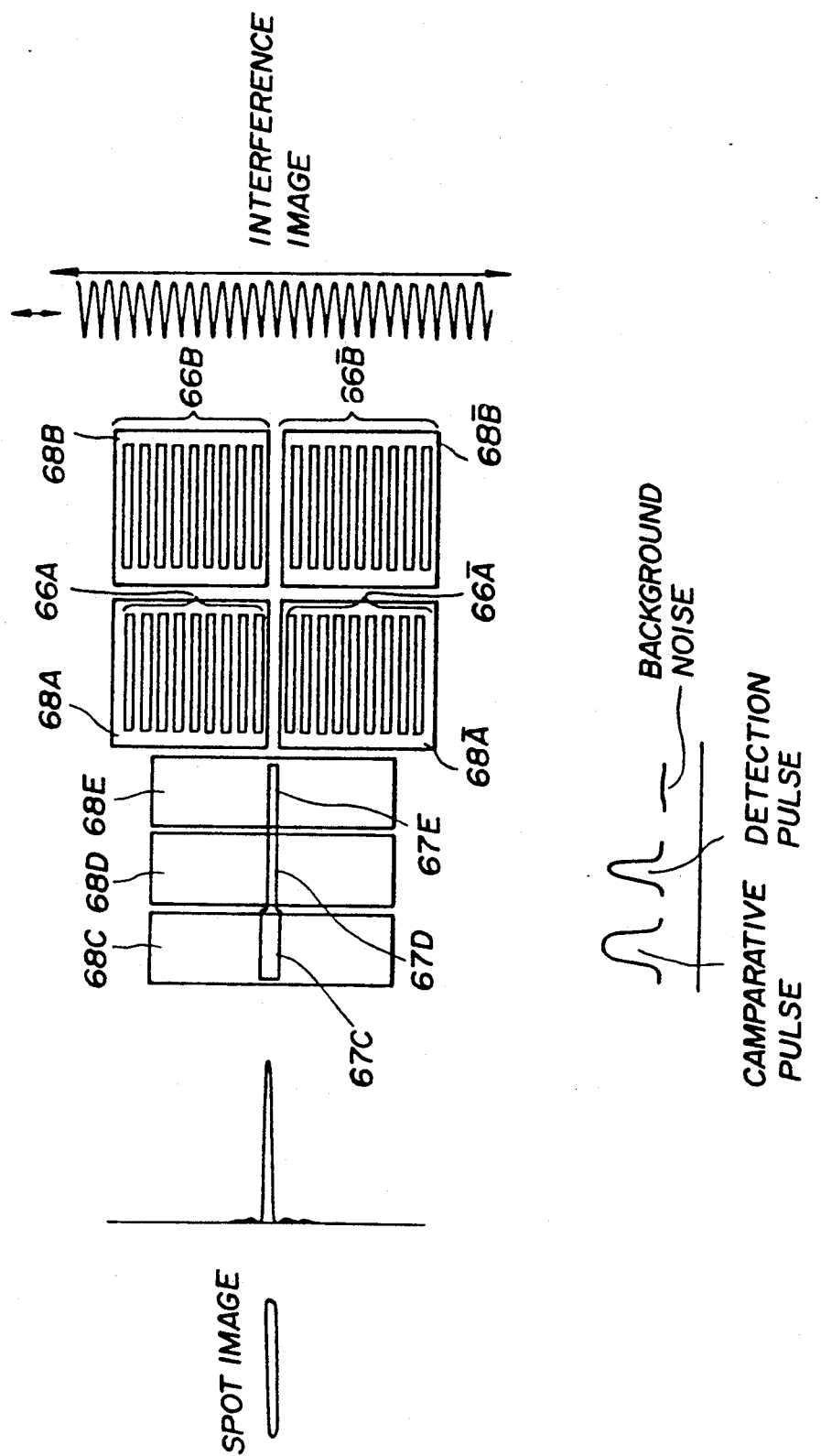

FIG. 20 is an illustrative diagram showing relative arrangement between the mask plate 65 and the photodetectors 68. As shown on the left side of the figure, the spot image is indicative of the reference point of the encoder disc and has a quite sharp peak intensity due to strong converging and diffracting effect of the holographic lens pattern. The spot image is formed in an elongated shape having a very small width in the displacement direction of the encoder disc, but having a relatively great length in the direction orthogonal to the displacement direction. Such elongated spot shape can be obtained by suitably designing the holographic lens pattern.

On the other hand, as shown in right side of FIG. 20, the one-dimensional diffractive grating forms the interference fringe image having continuous peaks which shift in either of the bidirections as indicated by the double-headed arrow vertically in the figure. Since this interference image is formed by the one-dimensional diffractive grating having slits arranged at a given pitch along the displacement direction of the disc, the interference image has relatively broad distribution in the orthogonal direction to thereby cover entire surface of the mask plate 65. A pair of spatial filters 66A and 66$\overline{\text{A}}$ are arranged adjacently along the shift direction of the interference image. These spatial filters 66A and 66$\overline{\text{A}}$ have the same spatial period which corresponds to the fringe pitch of the interference image, but they have a relative phase difference by 180°. Another pair of spatial filters 66B and 66$\overline{\text{B}}$ are arranged in parallel to the pair of spatial filters 66A and 66$\overline{\text{A}}$. These spatial filters 66B and 66$\overline{\text{B}}$ have also the same spatial period which corresponds to the fringe pitch of the interference image, but they have a relative phase difference by 180°. Further, there is a phase difference of 90° between the pair of filters 66A and 66$\overline{\text{A}}$ and the other pair of filters 66B and 66$\overline{\text{B}}$. Four photodetectors 68A, 68$\overline{\text{A}}$, 68B and 68$\overline{\text{B}}$ are disposed correspondingly to respective one of the four spatial filters 66A, 66$\overline{\text{A}}$, 66B and 66$\overline{\text{B}}$. These four photodetectors produce AC detection signals having phase differences of 90° and 180° correspondingly to the phase differences of the spatial filters.

The mask plate 65 is further formed thereon with the three slots 67C, 67D and 67E arranged linearly along the orthogonal direction. The wide slot 67C and narrow slot 67D are disposed within the spot image area so as to pass equi-dividedly the spot image. The dummy slot 67E is disposed outside the spot image area such that it could not receive the spot image. As described before, the diffracted light beam which forms the interference image irradiates the entire face of the mask plate 65 so that all of the three slots 67C, 67D and 67E receive unavoidably the diffracted light beam. Particularly, the dummy slot 67E passes only the diffracted light beam which forms the interference image because the dummy slot 67E is disposed outside the spot image area. Three photodetectors 68C, 68D and 68E are disposed in registration with the respective slots 67C, 67D and 67E. The photodetector 68C receives the incoming light beam through the wide slot 67C to produce a comparative pulse signal containing a comparative pulse having a wide pulse duration. The comparative pulse signal further contains a noise or background component due to subsidiary receipt of the interference image. The photodetector 68D receives the spot image through the narrow slot 67D to produce a detection pulse signal containing a detection pulse having a relatively narrow pulse width. Similarly, the detection pulse signal contains the background component due to superposed receipt of the interference image. Further, the photodetector 68E receives the incoming light beam through the dummy slot 67E to produce a background signal containing no pulse component related to the spot image. This background signal is generated in response to receipt of a part of the interference image so that it has a frequency identical to that of the AC detection signal. In this embodiment, the three slots 67C, 67D and 67E are arranged in phase-matching with the spatial filter 66A so that the background signal has the same phase as that of the AC detection signal produced by the photodetector 68A.

Figure 21:
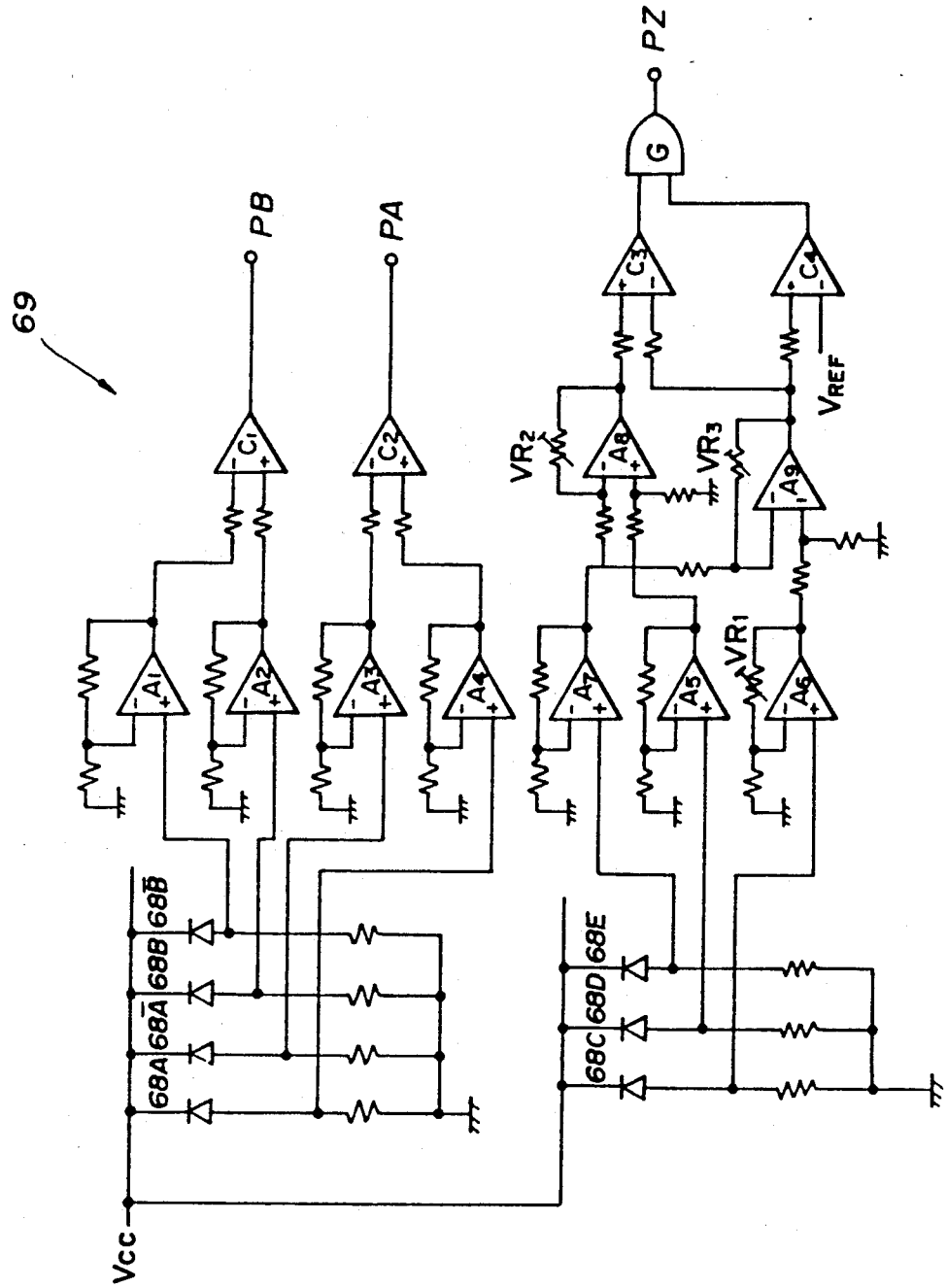

FIG. 21 is a block diagram showing a detailed circuit structure of the detection circuit 69. An amplifier A1 is connected to the photodetector 68B̄, an amplifier A2 is connected to the photodetector 68B, an amplifier A3 is connected to the photodetector 68Ā, and an amplifier A4 is connected to the photodetector 68A. Further, an amplifier A5 is connected to the photodetector 68D, and an amplifier A6 is connected to the photodetector 68C and is controlled its amplification rate by a variable resistor VR1. Further, an amplifier A7 is connected to the photodetector 68E. A comparator C1 is connected to output terminals of the amplifiers A1 and A2, and a comparator C2 is connected to output terminals of the amplifiers A3 and A4. A differential amplifier A8 is connected to output terminals of the amplifiers A5 and A7 and is controlled its input level by a variable resistor VR2. In similar manner, a differential amplifier A9 is connected to output terminals of the amplifiers A6 and A7 and is controlled its input level by a variable resistor VR3. Further, a comparator C3 is connected to output terminals of the amplifiers A8 and A9, and another comparator C4 is connected to the output terminal of the amplifier A9. The comparator C4 carries out comparing operation based on a preset voltage level $V_{REF}$. Lastly, a gate Circuit G composed of an AND gate is connected to output terminals of the comparators C3 and C4.

Figure 22:
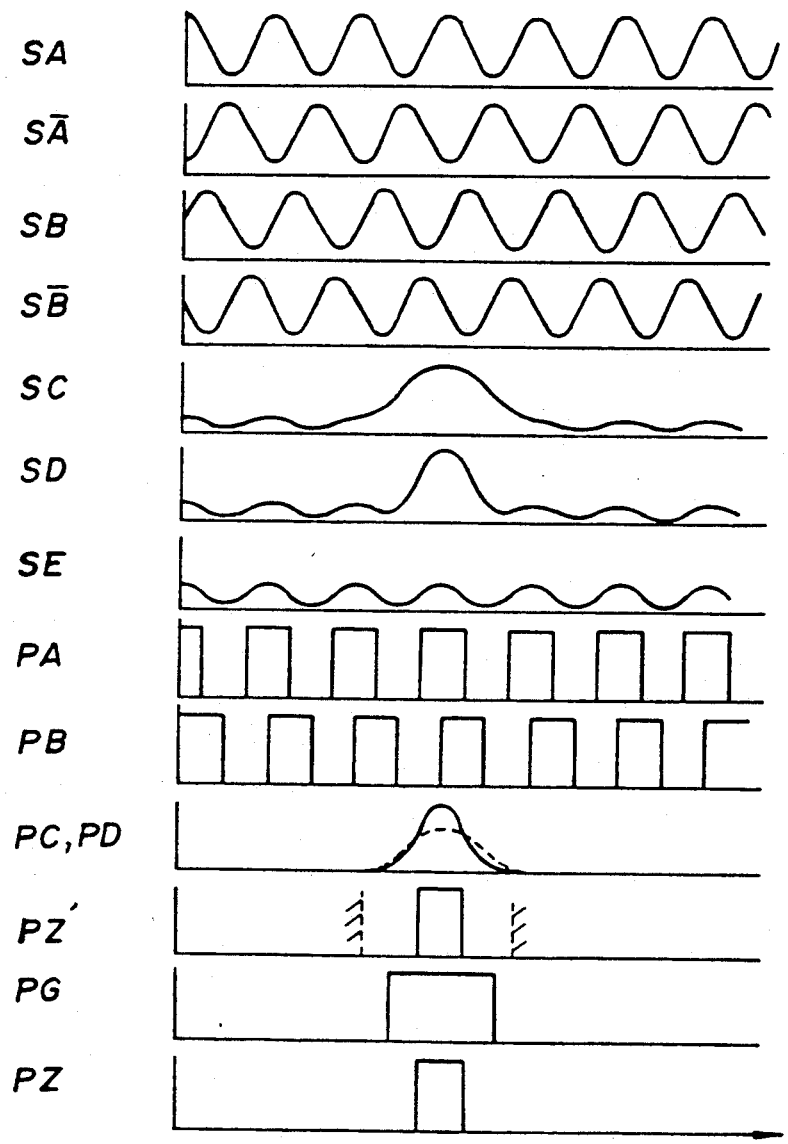

FIG. 22 shows various waveforms of signals occurring in the detection circuit 69. The description is given for operation of the FIG. 19 laser encoder in conjunction with FIG. 22. The photodetector 68A outputs an A-phase AC detection signal SA when receiving the interference fringe through the spatial filter 66A, and the photodetector 68Ā outputs an Ā-phase detection signal SĀ of the opposite phase having 180° phase difference relative to the signal SA. This phase difference corresponds to the spatial phase difference between the pair of spatial filters 66A and 66Ā. The detection signals have a frequency indicative of the rotational speed of the encoder disc and a number of peaks indicative of rotational amount thereof. In similar manner, the photodetector 68B outputs a B-phase AC detection signal SB having the same frequency, and the photodetector 68B̄ outputs a B̄-phase AC detection signal SB̄ of the opposite phase. The B-phase AC detection signal BS has a phase difference by 90° relative to the A-phase AC detection signal AS. This phase difference corresponds to the phase difference between the spatial filters 66A and 66B. Further, the photodetector 58C outputs the comparative pulse signal SC. The comparative pulse signal SC contains a comparative pulse component of wide pulse width and a noise or background component due to the interference image. The noise component has the same frequency and phase as those of the A-phase AC detection signal SA. The photodetector 68D outputs the detection pulse signal SD which contains a detection pulse component of narrow pulse width and a similar noise component. The comparative pulse component and the detection pulse component have the coincident peak positions with each other and have substantially the same pulse height because the spot image is concurrently and dividedly received by the photodetectors 68C and 68D. The photodetector 68E outputs an AC background signal SE having the same frequency and phase as those of the A-phase AC detection signal SA. However, its amplitude is smaller than that of the A-phase AC detection signal SA.

The A-phase AC detection signal SA and the Ā-phase AC detection signal SĀ are amplified by the respective amplifiers A3 and A4, and thereafter are compared to each other by the comparator C2 to produce an A-phase displacement signal PA. The A-phase displacement signal PA is formed of a train of square pulses by comparing the A-phase AC detection signal SA and the Ā-phase AC detection signal SĀ of the opposite phase to each other so that the A-phase displacement signal PA is suitable for digital processing to produce an encoder output. Even when the wavelength of incident light beam varies due to change in the ambient temperature etc. to cause level change of the AC detection signals, the level change can be cancelled out because the level change occurs concurrently in the A-phase and Ā-phase AC detection signals. Similarly, the B-phase AC detection signal SB and the B̄-phase AC detection signal SB̄ are amplified by the respective amplifiers A1 and A2, and then are compared to each other in the comparator C1 to produce a B-phase displacement signal PB. The B-phase displacement signal PB is also composed of a train of square pulses. However, the B-phase displacement signal PB has a phase difference of 90° relative to the A-phase displacement signal PA. This phase difference is of delay or advance nature dependently on the displacement direction of the encoder disc. Namely, the displacement direction can be detected in terms of relative phase relation between the A-phase displacement signal and the B-phase displacement signal.

The detection pulse signal SD is amplified by the amplifier A5 and is then inputted into a negative input terminal of the differential amplifier A8. The AC background signal SE is amplified by the amplifier A7 and is then inputted into a positive input terminal of the differential amplifier A8. At this stage, the input level of the AC background signal SE is suitably adjusted by the variable resistor VR2 so that its level is made comparable with the level of the noise component of the detection pulse signal SD inputted into the positive terminal. Consequently, the differential amplifier A8 operates to cancel the AC background signal SE and the noise component contained in the detection pulse signal SD to thereby output a shaped detection pulse PD.

In similar manner, the detection pulse signal SC is amplified by the amplifier A6 and is then inputted into a positive input terminal of the differential amplifier A9. The amplified AC background signal SE is concurrently inputted into a negative input terminal of the differential amplifier A9. At this stage, the input level of the AC background signal SE is suitably adjusted by the variable resistor VR3. Consequently, the differential amplifier A9 operates to cancel the AC background signal SE and the noise component contained in the comparative pulse signal SC with each other to thereby output a shaped comparative pulse PC.

In this operation, an amplification rate of the variable amplifier A6 is tuned suitably by the variable resistor VR1 so that the amplifier A9 outputs the shaped comparative pulse PC having a peak voltage level lower than that of the shaped detection pulse PD outputted from the amplifier A8.

Then, the comparator C3 directly receives the detection pulse PD and the comparative pulse PC to compare with each other to thereby produce a reference pulse signal PZ' of a square pulse. According to the embodiment, the comparator C3 can effect the accurate comparison since the detection pulse PD and the comparative pulse PC do not contain substantial noise component.

However, as shown in the figure, the output waveform PZ' of the comparator C3 contains not only the reference pulse signal PZ' but also may contain an indefinite noise component. Namely, when the encoder disc is stopped or the reference point thereof displaces away from the incident light beam, the outputs of the amplifier A8 and A9 are held unstable so that the comparator C3 falls in the unstable state. Consequently, the comparator C3 may produce a noise pulse due to disturbance. In order to remove such unstable factor in the operation of the comparator C3, the output signal of the amplifier A9 is compared with a predetermined voltage level $V_{REF}$ in the comparator C4 to form a gate pulse signal PG. As shown, the gate pulse signal PG is composed of a square pulse having a relatively wide pulse width. The gate circuit G is opened in response to the gate pulse signal PG to selectively pass the reference pulse signal PZ' to form a final Z-phase signal PZ.

Figure 23:
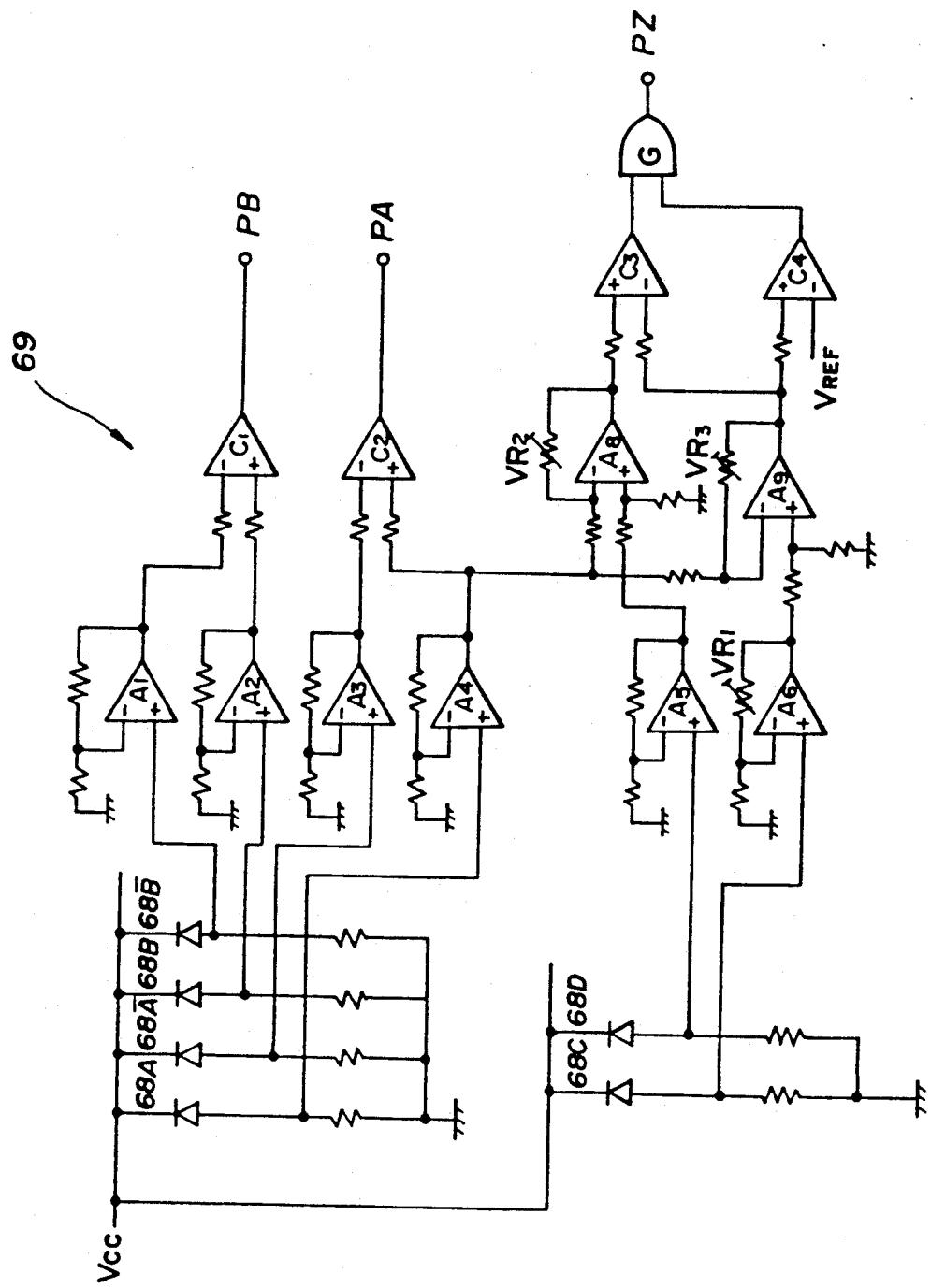

FIG. 23 shows a modification of the FIG. 21 circuit. The FIG. 23 detection circuit has basically the same construction and operation as that of the FIG. 21 detection circuit. Therefore, the like components are indicated by the like reference numerals. The difference from the FIG. 21 detection circuit is in that the photodetector 68E for producing the AC background signal is eliminated from the FIG. 23 detection circuit. Accordingly, a dummy slot is also removed from the fixed mask plate 65. Instead, the photodetector 68A is utilized as a source of the AC background signal in this modification. Namely, the photodetector 68A continuously produces the A-phase AC detection signal which has the same frequency and the same phase as those of the noise component contained in the comparative pulse signal and the detection pulse signal. Therefore, the A-phase AC detection signal can be transformed into the AC background signal. Namely, the A-phase AC detection signal fed from the photodetector 68A is amplified by the amplifier, and thereafter is inputted into the negative input terminals of the differential amplifiers A8 and A9. In this case, the input level of the A-phase AC detection signal is lowered by the variable resistors VR2 and VR3 comparably to the level of the noise component to effect removal of the noise component.

Figure 24:
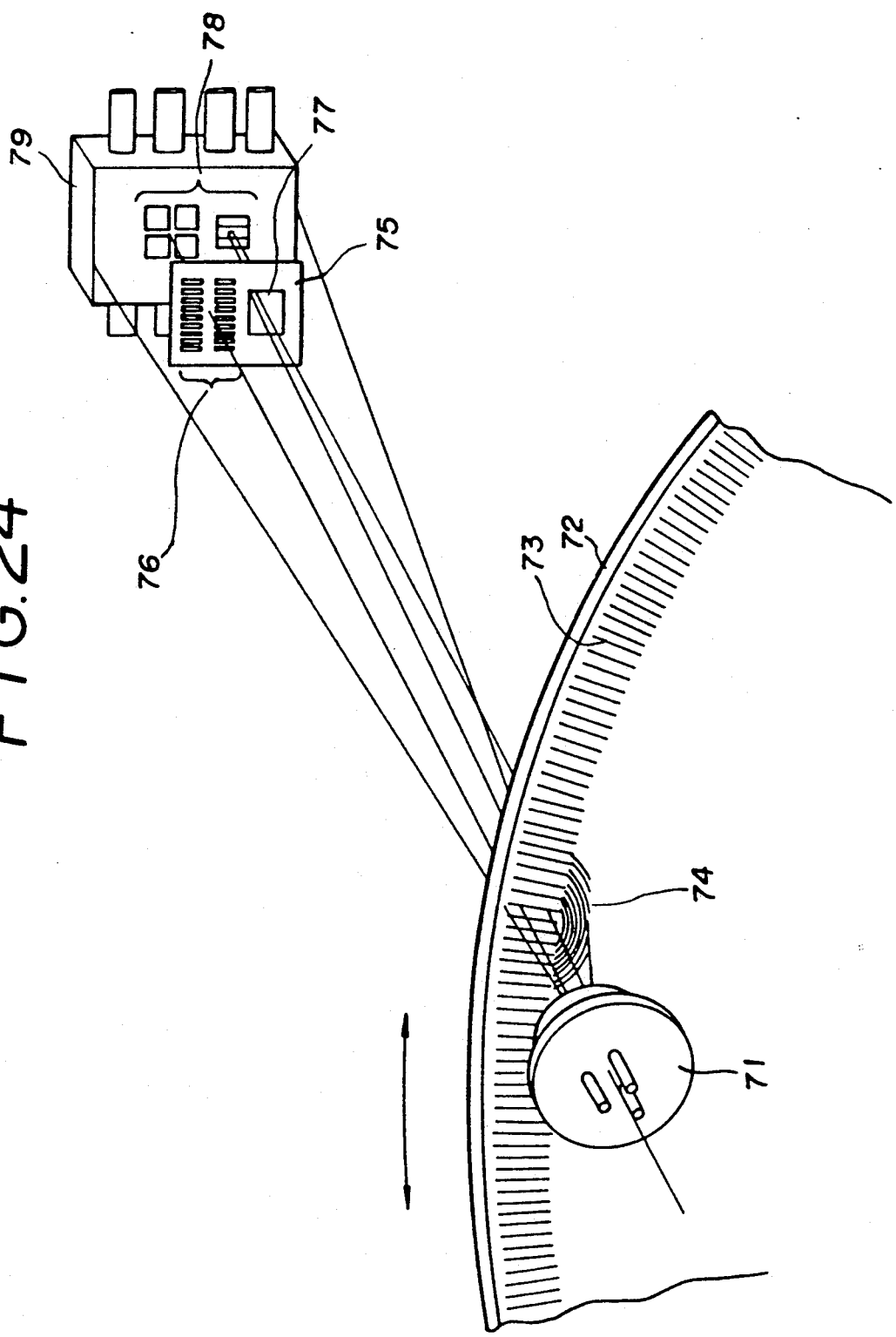

Lastly, FIG. 24 shows a further expedient of the laser rotary encoder according to the first aspect of the present invention. The FIG. 24 laser rotary encoder has a fixed light source 71 for producing a coherent incident light beam having a spherical wavefront. A rotary encoder disc 72 is disposed in front of the fixed light source 71 displaceably angularly in opposite directions to traverse the incident light beam. A one-dimensional diffractive grating or pattern 73 is formed along an annular periphery of the encoder disc 72. The grating 73 is composed of slits arranged along the displacement direction of the disc, i.e., circumferential direction of the disc and continuously diffract the incident light beam to form an interference image a given distance from the disc. The interference image is equivalent to an enlarged projection of the one-dimensional diffractive grating 73 so that the interference image shifts in response to the rotation of encoder disc 72. A local holographic lens pattern 74 is formed at a reference position of the encoder disc 72 adjacent to the one-dimensional diffractive grating 73. The holographic lens pattern 73 is composed of a plurality of coaxial ring slits such that its center coincides with the reference position of the disc. When the reference position crosses the incident light beam, the holographic lens pattern 74 diffracts the incident light. The diffracted output light beam forms a spot image on the same image plane as that of the interference image. The spot image occurs only while the local holographic lens pattern 74 is traversing the cross section of incident light beam, and shifts in the displacement direction of the encoder disc.

A stationary mask plate 75 is disposed in the coimage plane of the interference image and spot image. A window 77 is formed in the mask plate 75 and extends along the limited moving path of the spot image so as to pass the spot image. Further, the mask plate 75 is formed with a plurality of spatial filters 76 having a spatial period corresponding to a pitch of the interference image fringe. A plurality of photodetectors 78 are disposed immediately behind the mask plate 55 in opposed relation to the window and spatial filters. The plurality of photodetectors 78 are contained in a detection circuit 79.

Figure 25:
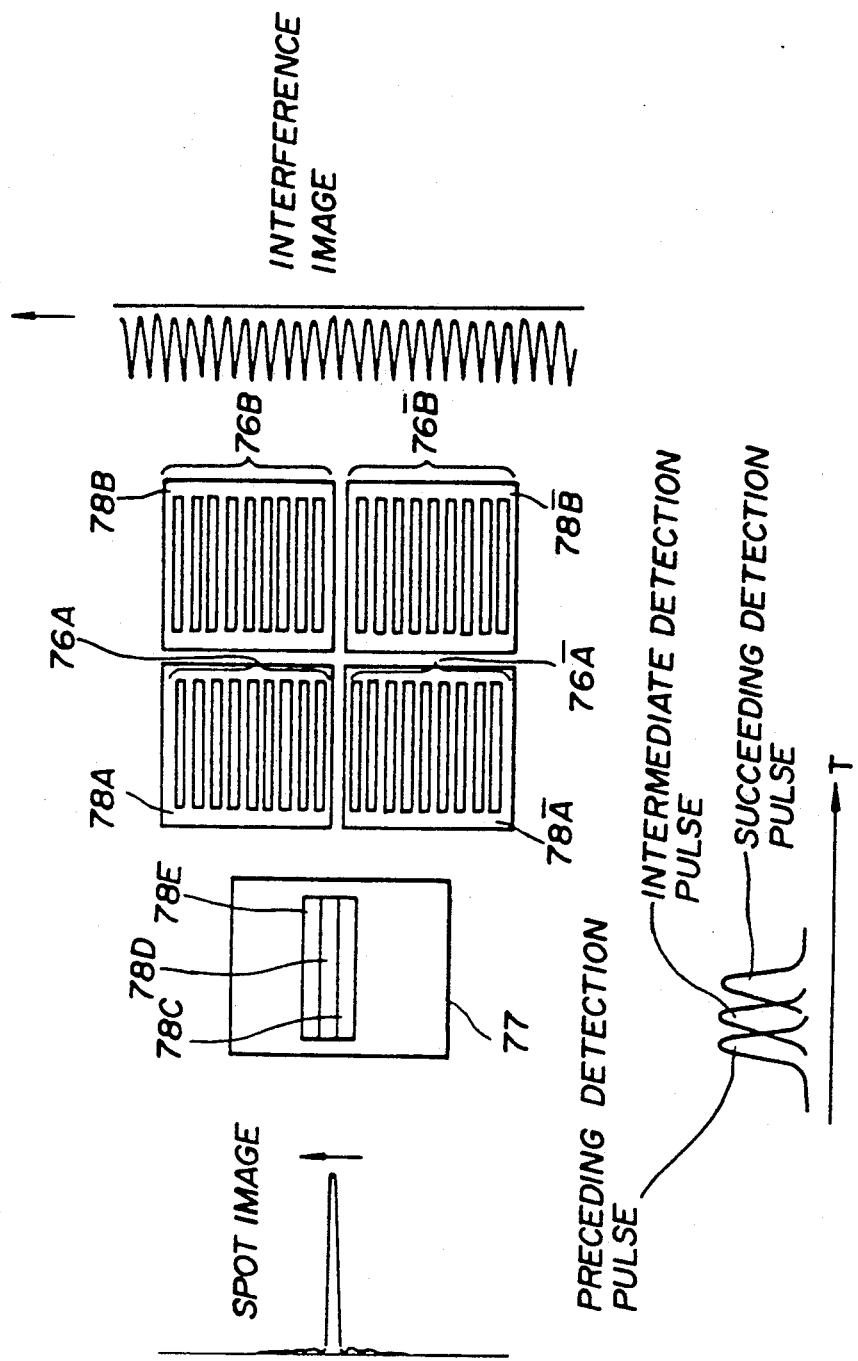

FIG. 25 is an illustrative diagram showing relative arrangement between the mask plate 75 and the photodetectors 78. As shown on the left side of the figure, the spot image is indicative of the reference point of the encoder disc. The spot image occurs only while the holographic lens pattern traverses the incident light beam and has a quite sharp peak intensity due to strong converging and diffracting effect of the holographic lens pattern. The spot image moves in the displacement direction of the disc as indicated by the arrow.

On the other hand, as shown in right side of FIG. 25, the one-dimensional diffractive grating forms the interference fringe image having continuous peaks which shift in the displacement direction of the encoder disc as indicated by the arrow vertically in the figure. Since this interference image is formed by the one-dimensional diffractive grating having slits arranged at a given pitch along the displacement direction of the disc, the interference image has relatively broad distribution in the orthogonal direction to thereby cover entire surface of the mask plate 75. A pair of spatial filters 76A and 76$\overline{\text{A}}$ are arranged adjacently along the shift direction of the interference image. These spatial filters 76A and 76$\overline{\text{A}}$ have the same spatial period which corresponds to the fringe pitch of the interference image, but they have a relative phase difference by 180°. Another pair of spatial filters 76B and 76$\overline{\text{B}}$ are arranged in parallel to the pair of spatial filters 76A and 76$\overline{\text{A}}$. These spatial filters 76B and 76$\overline{\text{B}}$ have also the same spatial period which corresponds to the fringe pitch of the interference image, but they have a relative phase difference by 180°. Further, there is a phase difference of 90° between the pair of and 76$\overline{\text{B}}$. Four photodetectors 78A, 78$\overline{\text{A}}$, 78B and 78$\overline{\text{B}}$ are disposed correspondingly to respective one of the four spatial filters 76A, 76$\overline{\text{A}}$, 76B and 76$\overline{\text{B}}$. These four photodetectors produce AC detection signals having phase differences of 90° and 180° correspondingly to the phase differences of the spatial filters.

Three photodetectors 78C, 78D and 78E are disposed behind the window 77 formed in the mask plate 75, and are arranged adjacently to each other in the moving direction of the spot image. Preferably, the three photodetectors have the same shape and dimension and are arranged at a interval corresponding to the pitch of the interference image fringe. By such construction, these three photodetectors can receive the same amount of the incoming light, which forms the interference image, through the window 77. Therefore, these three photodetectors has the same output level of the DC component which does not affect the detection accuracy.

Provided that the spot image moves upwardly as indicated by the arrow in the figure, the first photodetector 78C outputs a preceding detection pulse, the second photodetector 78D outputs an intermediate detection pulse, and the third photodetector 78E outputs a succeeding detection pulse, sequentially. These successive detection pulses overlap partly with one another, and are outputted time-sequentially according to the movement of the spot image.

Figure 26:
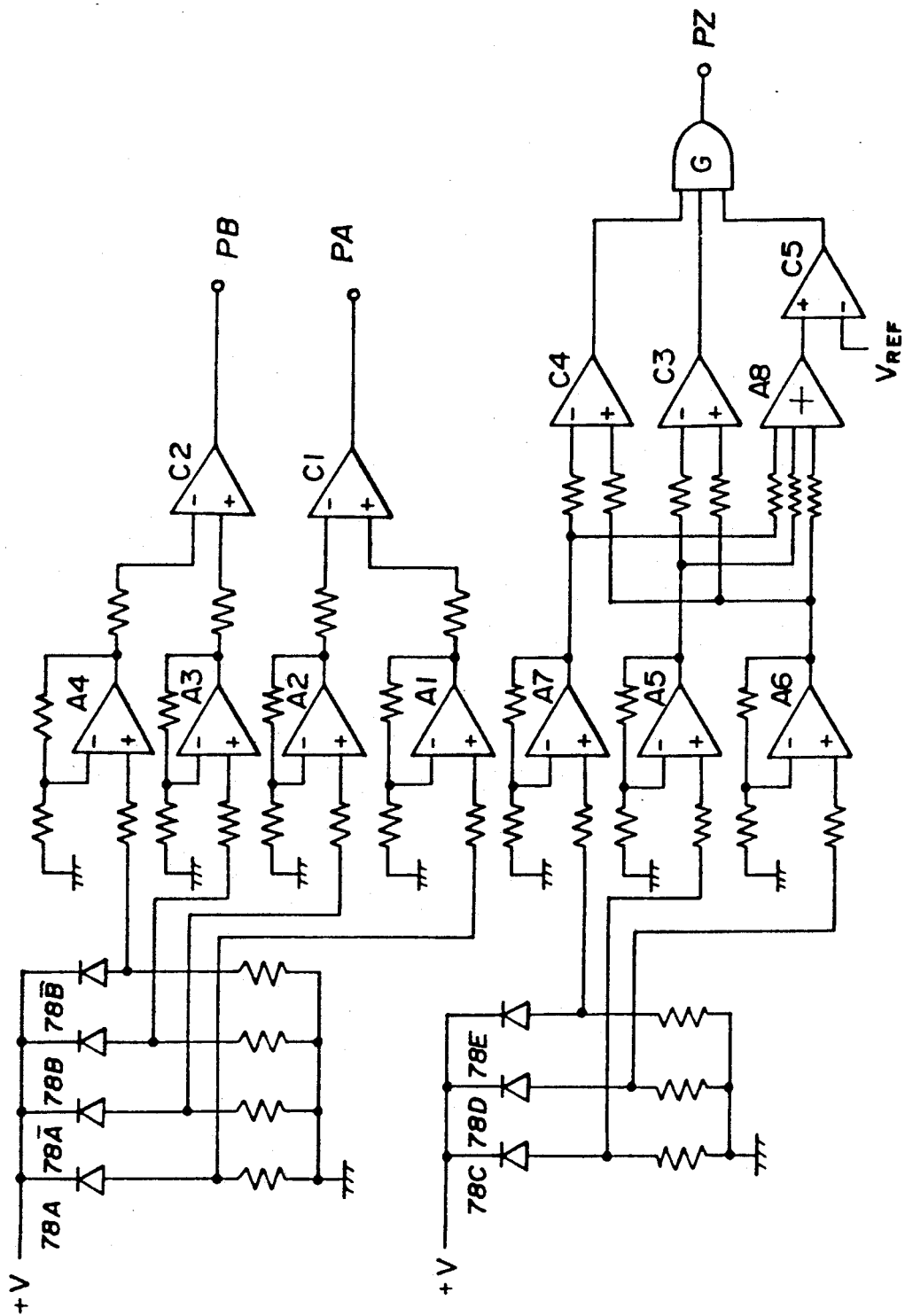

FIG. 26 is a block diagram showing a detailed circuit structure of the detection circuit 79. An amplifier A1 is connected to the photodetector 78A, an amplifier A2 is connected to the photodetector 78$\overline{\text{A}}$, an amplifier A3 is connected to the photodetector 78B, and an amplifier A4 is connected to the photodetector 78$\overline{\text{B}}$. A comparator C1 is connected to the pair of amplifiers A1 and A2, and another comparator C2 is connected to the pair of amplifiers A3 and A4. Further, an amplifier A5 is connected to the photodetector 78C, an amplifier A6 is connected to the photodetector 78D, and an amplifier A7 is connected to the photodetector 78E. A comparator C3 is connected at its positive input terminal to the output terminal of the amplifier A6 and connected at its negative input terminal to the output terminal of the amplifier A5. A comparator C4 is connected at its positive input terminal to the output terminal of the amplifier A6 and connected at its negative input terminal to the output terminal of the amplifier A7. A gate circuit G composed of an AND gate is connected at its input terminals to respective one of the comparators C3 and C4. An adder A8 is connected at its three input terminals to respective output terminals of the amplifiers A5, A6 and A7. A comparator C5 is connected at its one input terminal to the output terminal of the adder A3 and is supplied at its another input terminal with a preset level voltage $V_{REF}$. The comparator C5 is further connected at its output terminal to the remaining input terminal of the gate circuit G.

Figure 27:
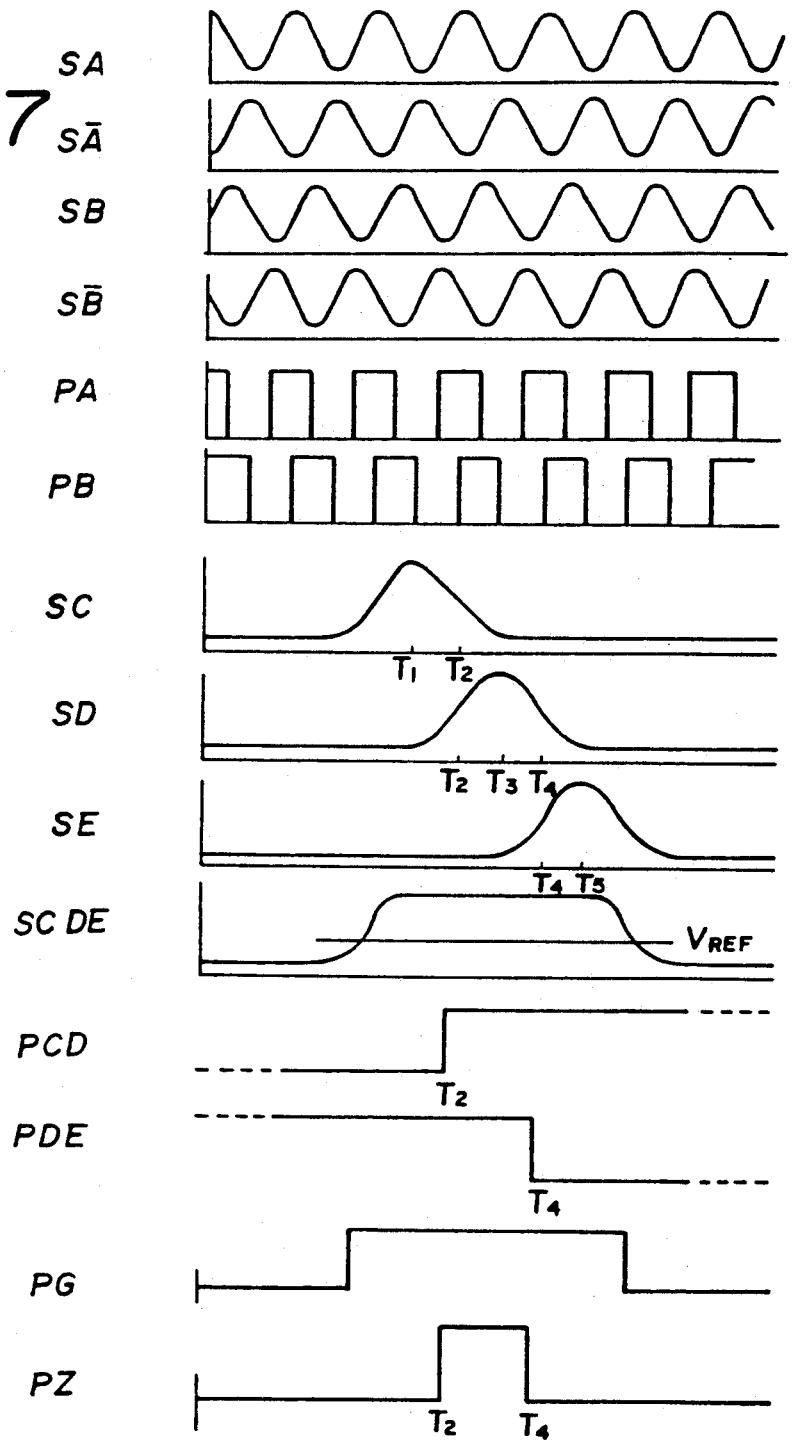

FIG. 27 shows various waveforms of signals occurring in the detection circuit 79. The description is given for operation of the FIG. 24 laser encoder in conjunction with FIG. 27. The photodetector 78A outputs an A-phase AC detection signal SA when receiving the interference fringe through the spatial filter 76A, and the photodetector 78$\overline{\text{A}}$ outputs an $\overline{\text{A}}$-phase detection signal S$\overline{\text{A}}$ of the opposite phase having 180° phase difference relative to the signal SA. This phase difference corresponds to the spatial phase difference between the pair of spatial filters 76A and 76$\overline{\text{A}}$. The detection signals have a frequency indicative of the rotational speed of the encoder disc and a number of peaks indicative of rotational amount thereof. In similar manner, the photodetector 78B outputs a B-phase AC detection signal SB having the same frequency, and the photodetector 78$\overline{\text{B}}$ outputs a $\overline{\text{B}}$-phase AC detection signal S$\overline{\text{B}}$ of the opposite phase. The B-phase AC detection signal BS has a phase difference by 90° relative to the A-phase AC detection signal SA. This phase difference corresponds to the phase difference between the spatial filters 76A and 76B.

The A-phase AC detection signal SA and the $\overline{\text{A}}$-phase AC detection signal S$\overline{\text{A}}$ are amplified by the respective amplifiers A1 and A2, and thereafter are compared to each other by the comparator C1 to produce an A-phase displacement signal PA. The A-phase displacement signal PA is formed of a train of square pulses by comparing the A-phase AC detection signal SA and the $\overline{\text{A}}$-phase AC detection signal S$\overline{\text{A}}$ of the opposite phase to each other so that the A-phase detection signal PA is suitable for digital processing to produce an encoder output. Even when the wavelength of incident light beam varies due to change in the ambient temperature etc. to cause level change of the AC detection signals, the level change can be cancelled out because the level change occurs concurrently in the A-phase and $\overline{\text{A}}$-phase AC detection signals. Similarly, the B-phase AC detection signal SB and the $\overline{\text{B}}$-phase AC detection signal S$\overline{\text{B}}$ are amplified by the respective amplifiers A3 and A4, and then are compared to each other in the comparator C2 to produce a B-phase displacement signal PB. The B-phase displacement signal PB is also composed of a train of square pulses. However, the B-phase displacement signal PB has a phase difference of 90° relative to the A-phase displacement signal PA. This phase difference is of delay or advance nature dependently on the displacement direction of the encoder disc. Namely, the displacement direction can be detected in terms of relative phase relation between the A-phase displacement signal PA and the B-phase displacement signal PB.

Figure 28:
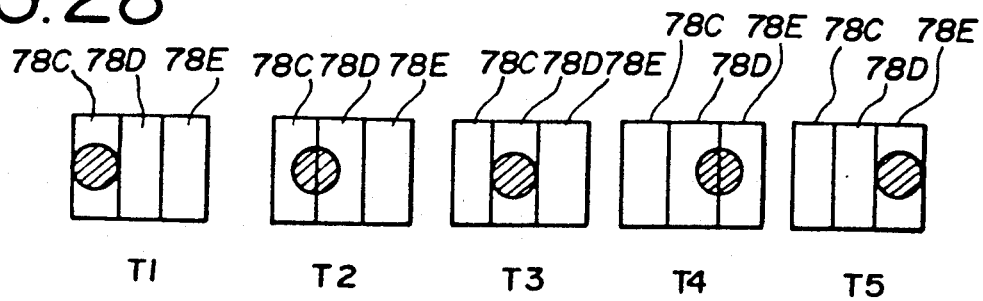

As shown in FIG. 27, the first photodetector 78C firstly receives the spot image to produce the preceding detection pulse SC. This pulse reaches its peak at timing T1 and then falls by half of the peak voltage level at timing T2, while the superposed DC component is not considered. As shown in FIG. 28, the timing T1 corresponds to when the spot image is located in the center of the first photodetector 78C, and the timing T2 corresponds to just when the spot image crosses the boundary between the first and second photodetectors 78C and 78D.

Then, the second photodetector 78D receives the spot image to produce an intermediate detection pulse SD. This pulse rises by half of the peak level at timing T2, then reaches the peak at timing T3, and thereafter falls by half of the peak level at timing T4. As shown in FIG. 28, the timing T3 corresponds to when the spot image enters the center of the second photodetector, and the timing T4 corresponds to just when the spot image crosses the boundary between the second and third photodetectors 78D and 78E. The preceding detection pulse SC and the intermediate detection pulse SD has the same voltage level at the timing T2.

Lastly, the third photodetector 78E outputs the succeeding detection pulse SE. This pulse rises by half of the peak level at timing T4 and reaches the peak at timing T5. As shown in FIG. 28, the timing T5 corresponds to when the spot image enters the center of the third photodetector 78E. The intermediate detection pulse SD and the succeeding detection pulse SE has the same voltage level at the timing T4.

These preceding, intermediate and succeeding detection pulses are amplified by the corresponding amplifiers A5, A6 and A7, and thereafter are inputted into the adder A8 so as to effect addition of these pulses. As shown in FIG. 27, the output waveform SCDE of the adder A8 is maintained at a high voltage level while the spot image travels across the array of the photodetectors 78C, 78D and 78E.

The amplified preceding and intermediate detection pulses are fed to the negative and positive input terminals of the comparator C3, respectively, to effect comparison therebetween. As shown in the figure, the output waveform PCD of the comparator C3 turns to a high voltage level at the timing T2. On the other hand, the amplified intermediate detection pulse and the succeeding detection pulse are fed into the positive and negative input terminals of the comparator C4, respectively, to effect comparison therebetween. As shown in the figure, the output waveform PDE of the comparator C4 turns to a low voltage level at the timing T4. These output waveforms from the comparators C3 and C4 are inputted into the gate circuit G and are logically processed to thereby produce a reference position signal PZ. As shown in FIG. 27, the reference position signal PZ is composed of a square pulse having a leading edge at the timing T2 and a trailing edge at the timing T4. Namely, the square pulse occurs during the period from the time when the spot image is divided half by one edge of the second photoconductor 78D to the time when the spot image is divided half by the other edge of the second photoconductor 78D. The three photodetectors 78C, 78D and 78E are arranged in the same phase as the spatial filter 76B so that the reference position signal PZ is produced in synchronization with one period of the B-phase displacement signal PB.

However, when the encoder disc is stopped or the reference point thereof displaces away from the incident light beam, the outputs of the amplifiers are held unstable so that the comparators C3 and C4 fall in the unstable state. In order to remove such unstable factor in the operation of the comparators C3 and C4, the output signal of the amplifier A8 is compared with a preset voltage level $V_{REF}$ in the comparator C5 to form a gate pulse signal PG. Then, the output signals of the comparators C3 and C4 are inputted into the gate circuit G to produce the reference position signal PZ in response to the gate signal PG so as to remove the indefinite state.

What is claimed is:

1. An apparatus for optically detecting displacement, comprising: light source means for emitting a coherent primary light; a displacement member undergoing a displacement transversely of the primary light to receive the primary light on its face, the displacement member having on its face a diffractive pattern effective to diffract the primary light and a holographic lens pattern effective to converge the primary light, thereby converting the primary light into a secondary light; and detection means receptive of the secondary light to detect optically the displacement of the displacement member.

2. An apparatus according to claim 1; wherein the diffractive pattern comprises a one-dimensional diffractive pattern arranged along a direction of the displacement so as to continuously diffract the primary light to form an enlarged diffraction image which shifts in the displacement direction, and the holographic lens pattern comprises a local holographic lens pattern disposed at a reference position of the displacement member and operative when traversing the primary light to converge a part of the primary light to form a reference spot image.

3. An apparatus according to claim 2; wherein the light source means includes a point light source for emitting a beam of coherent primary light having spherical wavefront, and the local holographic lens pattern has a size and shape corresponding to an effective cross section of the primary light beam.

4. An apparatus according to claim 2; wherein the displacement member comprises a rotational disc, the one-dimensional diffractive pattern is comprised of radial slits formed along an annular periphery of the disc, and the local holographic lens pattern is comprised of coaxial circular slits formed adjacent to the diffractive pattern radially inward of the annular periphery.

5. An apparatus according to claim 1; wherein the diffractive pattern comprises a one-dimensional diffractive pattern arranged along a direction of the displacement so as to continuously diffract the primary light to form an enlarged diffraction image which shifts in the displacement direction, and the holographic lens pattern comprises a planar holographic lens pattern arranged orthogonally in superposed relation to the diffractive pattern so as to contract the enlarged diffraction image in a direction normal to the displacement direction.

6. An apparatus according to claim 5; wherein the displacement member comprises a rotational disc, the one-dimensional diffractive pattern is comprised of radial slits formed along an annular periphery of the disc, and the planar holographic lens pattern is comprised of coaxial circular slits formed on the annular periphery.

7. An apparatus according to claim 1; wherein the diffractive pattern and the holographic lens pattern are comprised of etched slits formed on the same face of the displacement member.

8. An apparatus according to claim 1; wherein the displacement member comprises an elongated member undergoing linear displacement.

9. An apparatus according to claim 1; wherein the displacement member comprises an encoder plate disposed a given axial distance from the light source means along its optical axis to undergo displacement transversely of the primary light, the diffractive pattern comprises a one-dimensional diffractive pattern operative to diffract the primary light to form an enlarged diffraction image depending on a wavelength of the primary light in a direction of the optical axis, and the light source means includes a light source for emitting along the optical axis the coherent primary light having a varying wavelength dependent on an ambient temperature, a base for mounting the light source, and a compensative member interposed between the light source and the base to undergo thermal expansion and contraction along the optical axis in response to the ambient temperature so as to adjust the axial distance between the light source and the encoder plate to thereby effect compensation for the varying wavelength of the primary light dependent on the ambient temperature.

10. An apparatus according to claim 9; wherein the one-dimensional diffractive pattern comprises a type operative to form an enlarged diffraction image according to a first relation of $$\frac{M+L}{ML\lambda} T = \frac{G}{H}$$

where

M denotes a distance between the encoder plate and the enlarged diffraction image, L denotes the axial distance between the light source and the encoder plate, T denotes a pitch of the one-dimensional diffractive pattern, $\lambda$ denotes the wavelength of the coherent primary light, and G and H denote an integer, the light source comprises a type operative to emit the coherent primary light according to a second relation of $\lambda = \lambda_0 - \alpha \cdot \Delta t$ where $\lambda_0$ denotes a reference wavelength, $\Delta t$ denotes a temperature change and $\alpha$ denotes a wavelength variation coefficient, the encoder plate comprises a type adjustable to set the axial distance L according to a third relation of $L = -A\lambda + B$ where A and B are constants in order to satisfy the first relation, and the compensative member has an axial thickness S determined by a fourth relation of $S = \alpha \cdot A / \beta$ where $\beta$ denotes a linear thermal expansion coefficient of the compensative member in order to satisfy the third relation.

11. An apparatus according to claim 9; wherein the compensative member is composed of a thermally expandable and contractable plastic material.

12. An apparatus according to claim 2; wherein the detection means includes a mask plate disposed to selectively pass the reference spot image and formed thereon with a pair of a wide slot having a relatively wide effective opening width and a narrow slot having a relatively narrow effective opening width, one photodetector receptive of the reference spot image through the wide slot to produce a comparative pulse signal having a wide pulse width, another photodetector receptive of the reference spot image concurrently to said one photodetector to produce a detection pulse signal having a narrow pulse width, and a detection circuit operative to process the detection pulse signal with the comparative pulse signal to output a reference pulse signal indicative of passage of the reference point on the displacement member.

13. An apparatus according to claim 12; wherein the detection circuit includes a comparator operative to threshold the comparative pulse signal to form a gate pulse signal, and a gate circuit for gating the reference pulse signal in response to the gate pulse signal.

14. An apparatus according to claim 2; wherein the detection means includes a stationary mask plate arranged to selectively pass the secondary light, a first photodetector receptive of the shifting diffraction image through the stationary mask plate to produce a corresponding AC signal, a second photodetector receptive of the reference spot image superposed with the diffraction image through the stationary mask plate to produce a detection pulse signal containing a detection pulse component due to the spot image and an AC noise component due to the diffraction image, and a detection circuit operative to process the detection pulse signal with the AC signal to remove the AC noise component to output a reference pulse signal in synchronization with the detection pulse signal to thereby detect the reference point of the displacement member.

15. An apparatus according to claim 14; wherein the stationary mask plate has an effective slot for passing the reference spot image and a part of the diffraction image and a dummy slot arranged in registration with the effective slot along a direction normal to the displacement direction so as to pass only a part of the diffraction image, and wherein the first photodetector is disposed behind the dummy slot to thereby produce a background AC signal free of the detection pulse component and the second photodetector is disposed behind the effective slot to produce a detection pulse signal containing an AC background noise component and a detection pulse component.

16. An apparatus according to claim 14; wherein the stationary mask plate has an effective slot disposed to pass the reference spot image and a part of the diffraction image and a plurality of stationary slot groups operative to pass the shifting diffraction image with phase difference of 90° or 180° among the slot groups, and wherein the second photodetector is disposed behind the effective slot to produce a detection pulse signal containing an AC noise component having a given phase, and the first photodetector is disposed behind a slot group selected from the plurality of stationary slot groups to produce an AC signal having the same phase as that of the AC noise component.

17. An apparatus according to claim 2; wherein the detection means includes three photodetectors disposed adjacently to each other along the displacement direction for sequentially receiving the reference spot image while the local holographic lens pattern is traversing the primary light to thereby output successively a preceding detection pulse, an intermediate detection pulse and a succeeding detection pulse, and a detection circuit connected to the three photodetectors and operative to logically process with each other one comparison result between the preceding and intermediate detection pulses and another comparison result between the intermediate and succeeding detection pulses so as to produce a reference pulse signal indicative of the reference point of the displacement member.

18. An apparatus according to claim 17; wherein the detection circuit includes a comparator for thresholding an added output of the three successive detection pulses to output a gate signal, and a gate circuit for outputting the reference pulse signal in response to the gate signal.

19. An apparatus according to claim 17; wherein the three photodetectors are arranged a given interval corresponding to a pitch of the enlarged diffraction image.

* * * * *